United States Patent
Bartlow et al.

(10) Patent No.: US 10,800,141 B2
(45) Date of Patent: *Oct. 13, 2020

(54) ELECTRONIC DEVICE HAVING A GLASS COMPONENT WITH CRACK HINDERING INTERNAL STRESS REGIONS

(71) Applicant: Apple Inc., Cupertino, CA (US)

(72) Inventors: Christopher C. Bartlow, Menlo Park, CA (US); Dale N. Memering, Langhome, PA (US); Tyler A. Marshall, Sunnyvale, CA (US); Victor Luzzato, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,855

(22) Filed: Jan. 30, 2019

(65) Prior Publication Data

US 2019/0160787 A1 May 30, 2019

Related U.S. Application Data

(63) Continuation-in-part of application No. 16/143,309, filed on Sep. 26, 2018, and a continuation-in-part of application No. 15/676,860, filed on Aug. 14, 2017.

(Continued)

(51) Int. Cl.
*C03C 21/00* (2006.01)
*B32B 17/00* (2006.01)
*B32B 17/06* (2006.01)

(52) U.S. Cl.
CPC .............. *B32B 17/00* (2013.01); *B32B 17/06* (2013.01); *C03C 21/002* (2013.01);

(Continued)

(58) Field of Classification Search
None
See application file for complete search history.

(56) References Cited

U.S. PATENT DOCUMENTS 2,795,084 A 6/1957 Littleton
3,410,673 A 11/1968 Marusak
(Continued)

FOREIGN PATENT DOCUMENTS

DE 102016107630 10/2017
JP S6271215 5/1987
(Continued)

OTHER PUBLICATIONS

Moriceau et al., "Overview of recent direct wafer bonding advances and applications," Advances in Natural Sciences: Nanoscience and Nanotechnology, vol. 1, No. 043004, 11 pages, 2010. (Only p. 1 provided and considered.

(Continued)

*Primary Examiner* — David Sample
(74) *Attorney, Agent, or Firm* — Brownstein Hyatt Farber Schreck, LLP

(57) ABSTRACT

A component for an electronic device including an internal compressive stress region is disclosed herein. The internal compressive stress region may be created in a glass portion of the component or in a glass ceramic portion of the component. Electronic devices comprising the components and method for making the components are also disclosed.

20 Claims, 21 Drawing Sheets

Related U.S. Application Data

(60) Provisional application No. 62/701,519, filed on Jul. 20, 2018, provisional application No. 62/648,615, filed on Mar. 27, 2018, provisional application No. 62/398,627, filed on Sep. 23, 2016, provisional application No. 62/398,616, filed on Sep. 23, 2016, provisional application No. 62/398,611, filed on Sep. 23, 2016.

(52) U.S. Cl.
CPC ..... *B32B 2250/03* (2013.01); *B32B 2307/558* (2013.01); *B32B 2457/208* (2013.01)

(56) References Cited

U.S. PATENT DOCUMENTS

| | | | |
|---|---|---|---|
| 3,433,611 A | 3/1969 | Kubican | |
| 3,464,880 A | 9/1969 | Rinehart | |
| 3,737,294 A * | 6/1973 | Dumbaugh, Jr. | C03B 23/203 65/33.9 |
| 3,746,526 A * | 7/1973 | Giffon | C03B 23/20 65/121 |
| 3,899,315 A | 8/1975 | Siegmund | |
| 4,209,229 A | 6/1980 | Rittler | |
| 5,173,453 A | 12/1992 | Beall et al. | |
| 5,273,553 A | 12/1993 | Hoshi et al. | |
| 6,928,224 B2 | 8/2005 | Beall et al. | |
| 7,240,519 B2 | 7/2007 | Schwartz et al. | |
| 7,459,199 B2 | 12/2008 | Skeen | |
| 7,497,093 B2 | 3/2009 | Rosenflanz | |
| 7,799,158 B2 | 9/2010 | Yokoyama et al. | |
| 8,003,217 B2 | 8/2011 | Rosenflanz | |
| 8,092,737 B2 | 1/2012 | Chang et al. | |
| 8,212,455 B2 | 7/2012 | Yura et al. | |
| 8,277,704 B2 | 10/2012 | Matsushima et al. | |
| 8,379,159 B2 | 2/2013 | Hsu | |
| 8,665,160 B2 | 3/2014 | Uttermann et al. | |
| 8,783,065 B2 | 7/2014 | Schillert et al. | |
| 8,840,997 B2 | 9/2014 | Koyama et al. | |
| 8,898,824 B2 | 12/2014 | Neidich et al. | |
| 9,125,298 B2 | 9/2015 | Russell-Clarke | |
| 9,134,547 B2 | 9/2015 | McCabe et al. | |
| 9,140,522 B1 | 9/2015 | Miller et al. | |
| 9,242,889 B2 | 1/2016 | Yamakaji et al. | |
| 9,249,045 B2 | 2/2016 | Gabel et al. | |
| 9,321,677 B2 | 4/2016 | Chang et al. | |
| 9,359,251 B2 | 6/2016 | Bookbinder et al. | |
| 9,375,900 B2 | 6/2016 | Tsuchiya et al. | |
| 9,516,149 B2 | 12/2016 | Wright et al. | |
| 9,522,836 B2 | 12/2016 | Gulati et al. | |
| 9,674,322 B2 | 6/2017 | Motohashi et al. | |
| 9,718,727 B2 | 8/2017 | Bookbinder et al. | |
| 9,840,435 B2 | 12/2017 | Ohara et al. | |
| 9,890,074 B2 | 2/2018 | Liu | |
| 9,897,574 B2 | 2/2018 | Roussev et al. | |
| 9,902,138 B2 | 2/2018 | Edwards | |
| 9,902,641 B2 | 2/2018 | Hall et al. | |
| 9,946,302 B2 | 4/2018 | Franklin et al. | |
| 10,133,156 B2 | 11/2018 | Pilliod et al. | |
| 10,189,228 B2 | 1/2019 | Couillard et al. | |
| 10,286,631 B2 | 5/2019 | Alder et al. | |
| 2010/0285310 A1 | 11/2010 | Izutani et al. | |
| 2011/0041987 A1 | 2/2011 | Hori et al. | |
| 2012/0052271 A1 | 3/2012 | Gomez et al. | |
| 2012/0236526 A1 | 9/2012 | Weber | |
| 2013/0128434 A1 | 5/2013 | Yamamoto et al. | |
| 2013/0236666 A1 * | 9/2013 | Bookbinder | C03C 3/083 428/34.4 |
| 2014/0141217 A1 * | 5/2014 | Gulati | C03C 3/091 428/212 |
| 2015/0030834 A1 | 1/2015 | Morey et al. | |
| 2015/0104618 A1 | 4/2015 | Hayashi et al. | |
| 2015/0122406 A1 | 5/2015 | Fisher et al. | |
| 2015/0202854 A1 | 7/2015 | Tsuchiya et al. | |
| 2015/0232366 A1 | 8/2015 | Fredholm et al. | |
| 2015/0251383 A1 * | 9/2015 | Beall | C03B 17/02 428/428 |
| 2016/0083282 A1 | 3/2016 | Jouanno et al. | |
| 2016/0137550 A1 | 5/2016 | Murata et al. | |
| 2017/0066223 A1 | 3/2017 | Notsu et al. | |
| 2017/0282503 A1 | 10/2017 | Peng et al. | |
| 2017/0305788 A1 | 10/2017 | Nikulin | |
| 2017/0311466 A1 | 10/2017 | Memering et al. | |
| 2017/0355633 A1 | 12/2017 | Cook et al. | |
| 2018/0086663 A1 | 3/2018 | Luzzato et al. | |
| 2018/0088399 A1 | 3/2018 | Fukushi et al. | |
| 2018/0125756 A1 | 5/2018 | Gerrish et al. | |
| 2018/0126704 A1 | 5/2018 | Zhang et al. | |
| 2018/0154615 A1 | 6/2018 | Dohn et al. | |
| 2018/0237325 A1 | 8/2018 | Li et al. | |
| 2018/0304825 A1 | 10/2018 | Mattelet et al. | |
| 2018/0370843 A1 | 12/2018 | Gross et al. | |
| 2019/0022979 A1 | 1/2019 | Luzzato et al. | |
| 2019/0134944 A1 | 5/2019 | Dawson-Elli | |
| 2019/0161402 A1 | 5/2019 | Harris et al. | |
| 2019/0169061 A1 | 6/2019 | Jones et al. | |
| 2019/0263708 A1 | 8/2019 | Bookbinder et al. | |
| 2019/0293838 A1 | 9/2019 | Haba et al. | |
| 2020/0095159 A1 | 3/2020 | Marshall et al. | |

FOREIGN PATENT DOCUMENTS

| | | |
|---|---|---|
| WO | WO2012/027660 | 3/2012 |
| WO | WO2012/074983 | 6/2012 |
| WO | WO2015/031420 | 3/2015 |
| WO | WO2016/065118 | 4/2016 |
| WO | WO2017/196800 | 11/2017 |
| WO | WO2019/199791 | 10/2019 |

OTHER PUBLICATIONS

Mao et al., "Fabrication and characterization of 20 nm planar nanofluidic channels by glass-glass and glass-silicon bonding," www.rsc.org/loc, 8 pages, Jun. 30, 2005.

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

* cited by examiner

ELECTRONIC DEVICE HAVING A GLASS COMPONENT WITH CRACK HINDERING INTERNAL STRESS REGIONS

CROSS-REFERENCE TO RELATED APPLICATIONS

This application claims the benefit of U.S. Provisional Patent Application No. 62/701,519 filed on Jul. 20, 2018 and titled "Electronic Device Having a Glass Component with Crack Hindering Internal Stress Regions," and this application is a continuation-in-part application of U.S. patent application Ser. No. 16/143,309, filed Sep. 26, 2018 and titled "Thermoformed Cover Glass for an Electronic Device," which claims the benefit of U.S. Provisional Patent Application No. 62/648,615 filed on Mar. 27, 2018 and titled "Thermoformed Cover Glass for an Electronic Device," and which is a continuation-in-part patent application of U.S. patent application Ser. No. 15/676,860, filed Aug. 14, 2017 and titled "Thermoformed Cover Glass for an Electronic Device," which claims the benefit of U.S. Provisional Patent Application No. 62/398,611, filed on Sep. 23, 2016 and titled "Thermoformed Cover Glass for an Electronic Device," U.S. Provisional Patent Application No. 62/398,616, filed on Sep. 23, 2016 and titled "Thermoformed Cover Glass for an Electronic Device," and U.S. Provisional Patent Application No. 62/398,627, filed on Sep. 23, 2016 and titled "Thermoformed Cover Glass for an Electronic Device," the disclosures of which are hereby incorporated by reference herein in their entireties.

FIELD

The described embodiments relate generally to glass components for an electronic device. More specifically, the described embodiments relate to glass components that include internal compressive stress regions that may hinder crack propagation through the glass component.

BACKGROUND

Electronic devices often include transparent exterior components. For example, transparent cover members both protect and allow viewing of a display within the device. However, some traditional glass cover members may be susceptible to cracking when subjected to severe impact, such as when the electronic device is dropped.

Embodiments described herein are directed to electronic device components that may have advantages as compared to some traditional glass components. The techniques described herein are generally directed to components that may include a residual internal compressive stress region in a glass or glass ceramic portion. The components described herein may have improved resistance to cracking and therefore provide enhanced durability of the components and electronic devices including the components. In general, the components formed using the described techniques may not suffer from the drawbacks associated with some traditional glass components for electronic devices.

SUMMARY

Embodiments described herein relate to components for electronic devices which include a crack hindering residual internal compressive stress region. The internal compressive stress region may be located in a glass or glass ceramic portion of the component. As examples, the component may be a glass component, such as a monolithic glass component formed of a single piece of glass or a glass laminate. As an additional example, the component may comprise an internal glass ceramic portion and external glass portions. The components may be transparent, translucent, or opaque.

In embodiments, the component comprises a residual internal compressive stress region. The residual internal compressive stress region is present in the absence of an external load or force. The presence of a residual internal compressive stress region in the component may strengthen the component against cracking. Therefore, a glass component including a residual internal compressive stress region may be referred to as a strengthened glass component. The term strengthened glass component may also be used to refer to a component comprising both glass and glass ceramic portions. For brevity, a residual compressive stress region may be referred to herein as a compressive stress region and a residual tensile stress region may be referred to herein as a tensile stress region.

The internal compressive stress region of the component may act to hinder movement of a crack through a thickness of the component, thereby limiting damage to the component. For example, the internal compressive stress in this region may prevent a crack from passing through the region. In some cases the crack may continue to move through the component, but may move in a different direction. For example, the crack may at least partially reverse direction by moving away from the internal compressive stress region. Therefore, the residual internal compressive stress region may deflect a crack propagating through an internal tensile stress region in the component. The internal compressive stress region may be in the form of a layer.

In embodiments, the component further comprises at least one external compressive stress region. The external compressive stress region may provide an initial barrier to generation and/or movement of cracks from a surface of the component into an internal portion of the component. The external compressive stress region may be positioned along at least one external surface of the component. In embodiments, an external compressive stress region may be positioned along front, back, and side surfaces of the component. The component further comprises an internal tensile stress region located between the internal compressive stress region and the external compressive stress region. The internal tensile stress region may be inward from the external compressive stress region along a thickness of the component and the internal compressive stress region may be inward from the internal tensile stress region along a thickness of the component. The external compressive stress region and/or the internal tensile stress region may be in the form of a layer.

As an example, a strengthened glass component for an electronic device may comprise a surface at least partially defining an exterior of the electronic device and a compressive stress region extending from the surface to a first depth in the component. The surface further defines an exterior of the component. The compressive stress region may therefore be referred to as an external compressive stress region. The component may further comprise an internal tensile stress region inward from the external compressive stress region and an internal compressive stress region inward from the internal tensile stress region. The internal tensile stress region may extend from the first depth to a second depth in the component and the internal compressive stress region may extend from the second depth to a third depth in the component. In further embodiments, the internal tensile stress region is a first internal tensile stress region and the component further comprises a second internal tensile stress region inward from the internal compressive stress region and extending from the third depth to a fourth depth in the component.

In additional embodiments, the component comprises multiple internal compressive stress regions and/or external compressive stress regions. For example, a strengthened glass component for an electronic device may comprise: a first external surface defining at least a portion of an exterior of the electronic device, a first external compressive stress region along the first external surface, a first internal tensile stress region inward from the first external compressive stress region, and an internal compressive stress region inward from the first internal tensile stress region. The strengthened glass component may further comprise: a second external surface opposite to the first external surface, a second external compressive stress region along the second external surface, and a second internal tensile stress region inward from the second external compressive stress region. In further embodiments, the component comprises a third internal tensile stress region between the first internal compressive stress region and the second internal compressive stress region.

In embodiments, a method for making a component comprising an internal compressive stress region comprises creating an internal compressive stress region, an external compressive stress region, and an internal tensile stress region in the component. The external compressive stress region may be along at least one surface of the component. The internal tensile stress region may be inward from the external compressive stress region. The internal tensile stress region may also be positioned between the external and the internal compressive stress regions. The internal compressive stress region is inward from the external compressive stress region and the internal tensile stress region. In further embodiments, the method comprises creating another internal tensile stress region inward from the internal compressive stress region of the glass component For example, a method of strengthening a glass component comprises forming an external compressive stress region extending from a surface to a first depth in the glass component. The method further comprises forming an internal tensile stress region extending from the first depth to a second depth in the glass component and forming an internal compressive stress region extending from the second depth to a third depth in the glass component.

Several techniques can create an internal compressive stress region in the component. For example, an exchange of ions in a glass or a glass ceramic component can create an internal compressive stress region. As another example, crystallizing a portion of a glass component to form a glass ceramic can create an internal compressive stress region. In additional examples, glass layers having different compositions and/or properties can be used to create an internal compressive stress region in a glass laminate component. In embodiments, the glass laminate component comprises a first outer layer formed from a first glass material, an inner layer formed from a second glass material, and a second outer layer formed from a third glass material. For example, the glass laminate component may comprise outer layers each having a higher coefficient of thermal expansion than that of the inner layer. As another example, the inner layer of the glass laminate may have a greater tendency to expand in response to ion exchange than the outer layers.

BRIEF DESCRIPTION OF THE DRAWINGS

The disclosure will be readily understood by the following detailed description in conjunction with the accompanying drawings, wherein like reference numerals designate like elements.

Figure 1A:
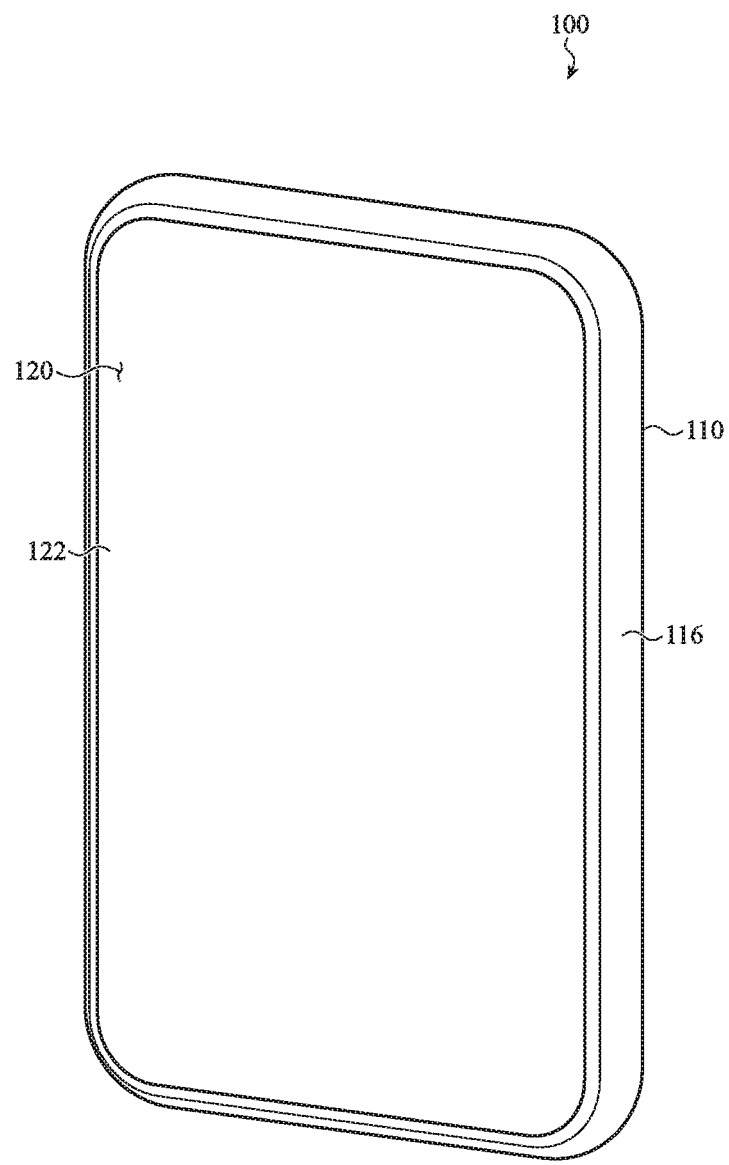
FIG. 1A depicts a front view of a simplified example of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The current description is generally directed to components for electronic devices, which incorporate one or more internal compressive stress regions. The internal compressive stress region may be located in an internal glass portion or in an internal glass ceramic portion of the component. The component may further comprise an external compressive stress region and an internal tensile stress region between the external compressive stress region and the internal compressive stress region.

The presence of one or more internal compressive stress regions may reduce or hinder the propagation of cracks or defects within the glass component. In some implementations, the internal compressive stress regions may improve the durability and/or impact resistance of the glass component. The techniques and examples described herein may be used to create glass components for a cover glass of an electronic device, enclosure components of an electronic device, and other glass articles that may form at least a portion of an external surface of the electronic device. In some instances, the glass component may be internal to the electronic device or an electronic device enclosure.

As described in more detail herein, the internal compressive stress regions may be formed any number of different ways. In some example embodiments, the internal compressive stress region may be created, at least in part, due to an ion exchange process. The internal compressive stress region may also be created by crystallization of a portion of a glass component to form a glass ceramic. As an additional example, the internal compressive stress region may be created in an inner layer of a glass laminate having different thermal expansion and/or ion expansion properties than outer layers of the glass laminate. Electronic devices including the components and methods for making the components are also disclosed herein.

These and other embodiments are discussed below with reference to FIGS. 1A-17. However, those skilled in the art will readily appreciate that the detailed description given herein with respect to these figures is for explanatory purposes only and should not be construed as limiting.

FIG. 1A depicts a front view of a simplified example of an electronic device. As shown in FIG. 1A, the electronic device 100 includes a housing 110 and a cover member 120. The housing 110 may be formed from one or more metal or metallic components, a glass component, a ceramic component, or a combination thereof. The housing 110 may include a side surface 116. As an example, the side surface 116 may be defined by one or more metal components. In one example, the side surface 116 is formed from a series of metal segments that are separated by polymer or dielectric segments that provide electrical isolation between adjacent metal segments. As additional examples, the side surface 116 may be defined by one or more glass components, a glass ceramic component, or a component including a glass and a glass ceramic.

The cover member 120 may be formed from a glass, a ceramic, or a combination thereof. As shown, cover member 120 defines a front surface 122, which may form at least a portion of an exterior of the electronic device 100. For example, the front surface 122 of the cover member 120 may define at least a portion of the front surface of the electronic device 100. The cover member 120 may be coupled to the housing 110 using a fastener or fastening technique. For example, the cover member 120 may be coupled to the housing 110 using an adhesive, an engagement feature, a fastener, or a combination of any of these. As discussed herein, the cover member 120 may include an internal compressive stress region. However, the description provided is not limited to cover members and the principles described herein are applicable to other electronic device components, such as components of the housing 110.

The cover member 120 may be positioned over a display that is configured to produce a graphical output that is viewable through a transparent window region of the cover member. For purposes of the following disclosure, the cover member 120 is described as a sheet of glass. However, the cover member 120 may be formed from multiple layers that include glass sheets, polymer sheets, and/or various coatings and layers. In some instances, a touch-sensitive layer (e.g., a capacitive touch sensor) is attached to the cover member 120 and positioned between the cover member 120 and the display.

Figure 1B:
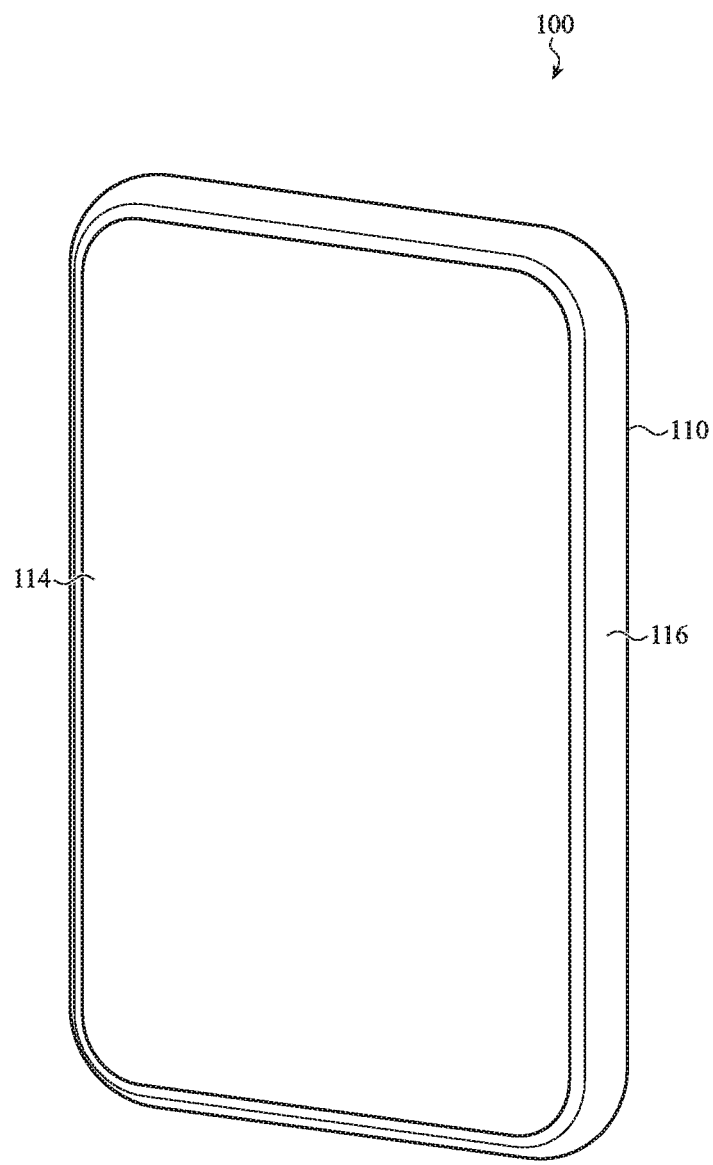
FIG. 1B depicts a back view of the electronic device of FIG. 1A.

FIG. 1B depicts a back view of the electronic device 100 of FIG. 1A. The housing 110 further comprises back surface 114 and side surface 116. In embodiments, the electronic device 100 may further include a second cover member, which forms at least a portion of the back surface 114 of the electronic device 100. The second cover member may be formed from a glass material that may include an internal compressive stress region, as described herein. The second or rear cover member may be partially transparent, formed from a transparent glass sheet, or may be opaque. In some cases, the second or rear cover includes one or more openings for a camera, light source, or other optical component.

In some embodiments, the electronic device 100 may be a mobile telephone, a notebook computing device (e.g., a notebook), a tablet computing device (e.g., a tablet), a portable media player, a wearable device, or another type of portable device. The electronic device 100 may also be a desktop computer system, computer component, input device, or virtually any other type of electronic product or device component.

Figure 2:
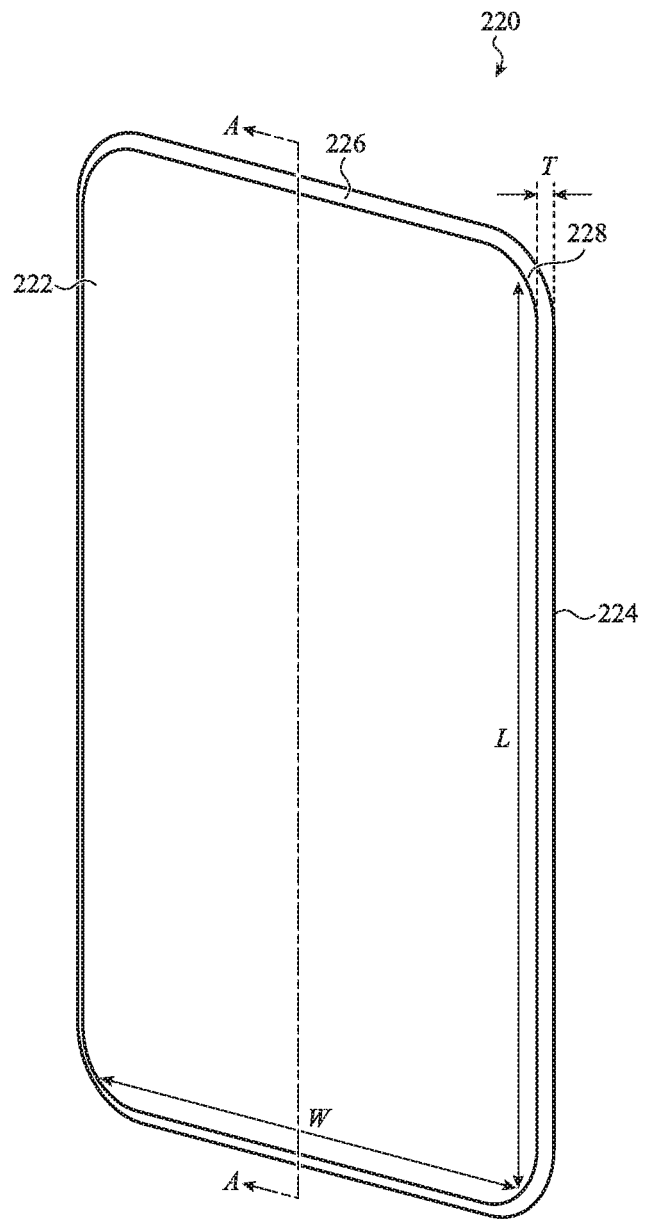
FIG. 2 depicts a simplified example of a cover member for the electronic device of FIG. 1A.

As shown in FIG. 2, cover member 220 may define a front surface 222, a back surface 224, and a side surface 226 extending between the front surface 222 and the back surface 224. As shown, cover member 220 is generally rectangular and defines a length, L, a width, W, and a thickness, T. The thickness T of cover member 220 may be from 0.3 mm to 3 mm, 0.1 mm to 2 mm, or from 25 µm to 1 mm. While cover member 220 is depicted as being generally rectangular in shape for purposes of illustration, the cover member shape shown is not intended to be limiting. In addition, while the edges 228 between the front surface 222 and the side surface 226 and between the back surface 224 and the side surface 226 are shown as rounded, the shape shown is not intended to be limiting.

As an example, the cover member 220 may be at least partially transparent. For example, the cover member 220 may have a transmittance in the visible spectrum of at least 50% or at least 75%. The cover member 220 may define one or more transparent portions to allow viewing of a display within the electronic device and/or function as a window for a camera or an optical sensor. In other examples, the cover member 120 may be translucent or opaque over a portion or all of the area of the component. The cover member 120 may also include one or more regions that are covered with a decoration or an opaque coating.

In embodiments, the cover member 220 includes an aluminosilicate glass or glass ceramic or a boroaluminosilicate glass or glass ceramic. As used herein, an aluminosilicate glass or glass ceramic includes the elements aluminum, silicon, and oxygen, but may further include other elements. Similarly, a boroaluminosilicate glass or glass ceramic includes the elements boron, aluminum, silicon, and oxygen, but may further include other elements. For example, an aluminosilicate glass or glass ceramic or a boroaluminosilicate glass or glass ceramic may further include monovalent or divalent ions which compensate charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. In embodiments, the aluminosilicate glass may comprise greater than 0.1 mol % $Li_2O$ or greater than 1 mol % $Li_2O$. In additional embodiments, the base composition may comprise from 0.1% to 10% lithium by weight of the base glass.

Figure 3A:
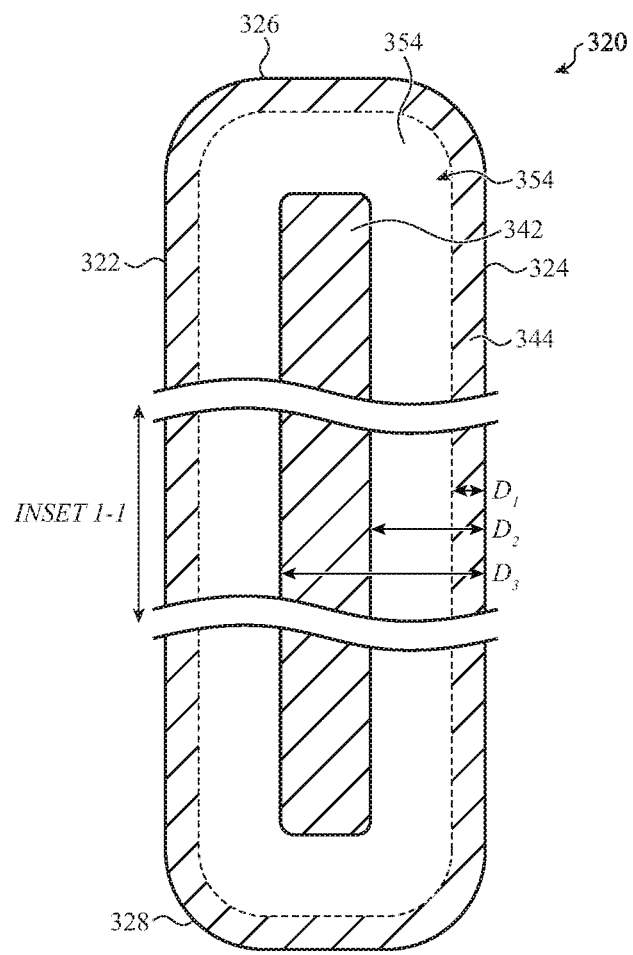
FIG. 3A shows a simplified cross-section view of an example cover member having an internal and an external region of compressive stress.

FIG. 3A shows a simplified cross-section view of an example cover member 320 having an internal and an external compressive stress region. The cross-section is taken along line A-A in FIG. 2 and hatching is used to indicate regions of compressive stress. The cover member 320 includes an internal compressive stress region 342, an external compressive stress region 344, and an internal tensile stress region 354.

As shown in FIG. 3A, external compressive stress region 344 extends along the front surface 322, the back surface 324, and the side surface 326 of the cover member 320. External compressive stress region 344 may also extend around the edge between the front surface 322 and the side surface 326. The external compressive stress region 344 may extend from front surface 322 or back surface 324 to a first depth $D_1$. The external compressive stress region 344 may take the form of a layer and be referred to as an external compressive stress layer.

The cover member 320 further includes an internal tensile stress region 354 inward from the external compressive stress region 344. As shown, the internal tensile stress region 354 is located between external compressive stress region 344 and internal compressive stress region 342. The internal tensile stress region 354 may extend from the first depth $D_1$ to a second depth $D_2$. The internal tensile stress region 354 may take the form of a layer and be referred to as an internal tensile stress layer.

The cover member 320 further includes internal compressive stress region 342 inward from the internal tensile stress region 354. As shown, the internal compressive stress region 342 may extend from the second depth $D_2$ to a third depth $D_3$. As shown, an internal compressive stress region 342 may be centrally located in the cover member 320. As an example, a centrally located stress region may include locations about halfway between front surface 322 and back surface 324 and about halfway between opposing side surfaces 326. As used herein, a stress region is inward of another stress region when at least a portion of the stress region is closer to the central portion of the cover member than the other stress region. The external compressive stress region 344 may take the form of a layer and be referred to as an external compressive stress layer.

Figure 3B:
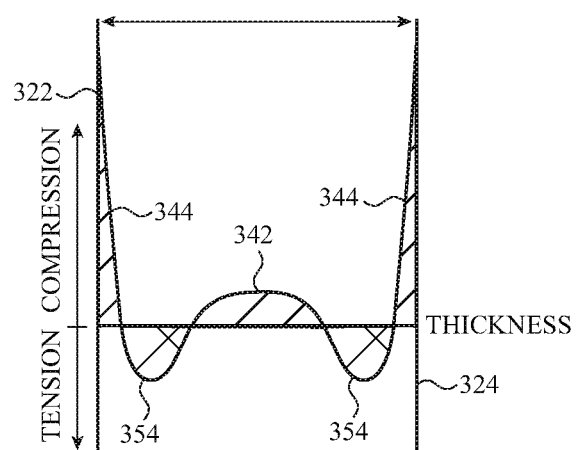
FIG. 3B shows an example of the variation of residual stress across the thickness for the cover member of FIG. 3A.

FIG. 3B shows an example of the variation of residual stress with thickness for the cover member of FIG. 3A. The cover member 320 includes an internal compressive stress region 342, an internal tensile stress region 354, and an external compressive stress region 344. The internal tensile stress region 354 is inward from the external compressive stress region 344 and the internal compressive stress region 342 is inward from the internal tensile stress region 354. As shown in FIG. 3B, a level of the compressive stress is greater in external compressive stress region 344 than in internal compressive stress region 342.

In additional embodiments, the external compressive stress region may comprise a first external compressive stress region and a second external compressive stress region. For example, a first external compressive stress region may be formed along a first external surface of the cover member and a second external compressive stress region may be formed along a second external surface of the cover member. The second external surface may be generally opposite to the first external surface.

Figure 3C:
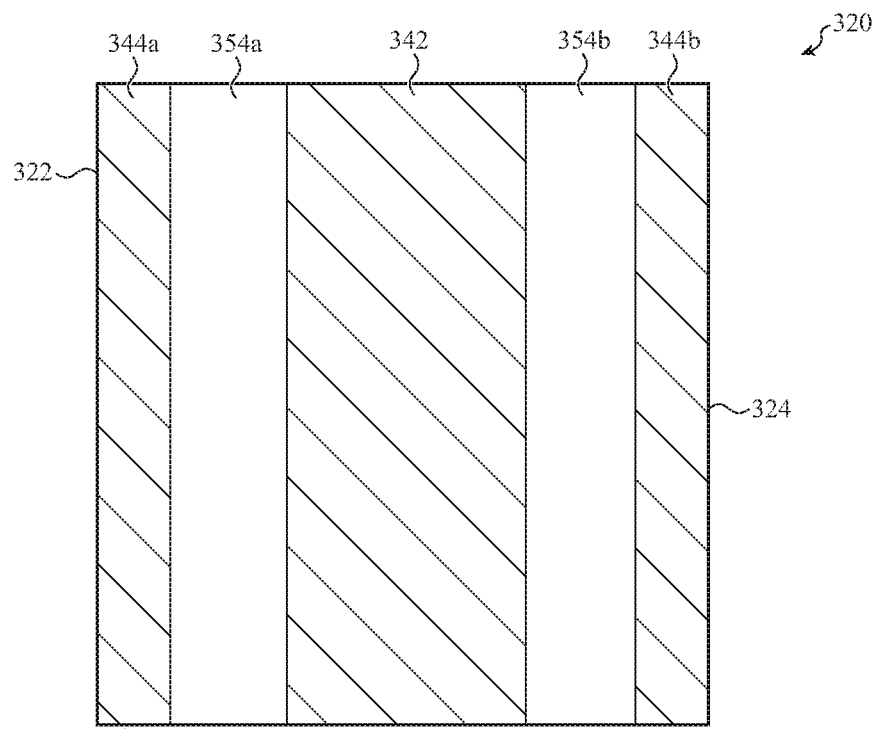
FIG. 3C shows an enlarged view of another example cover member having internal and external regions of compressive stress.

FIG. 3C shows a partial cross-section of a cover member 320 including a first external compressive stress region and a second external compressive stress region. The first external compressive stress region 344a may be formed along front surface 322 and the second external compressive stress region 344b may be formed along back surface 324. The cover member may further comprise a first internal tensile stress region 354a inward from the first internal compressive stress region 344a and a second internal tensile stress region 354b inward from the second external compressive stress region 344b. In addition, the cover member 320 may comprise an internal compressive stress region 342 inward from the first internal tensile stress region 354a. The internal compressive stress region 342 may also be inward from the second internal tensile stress region 354b.

Figure 3D:
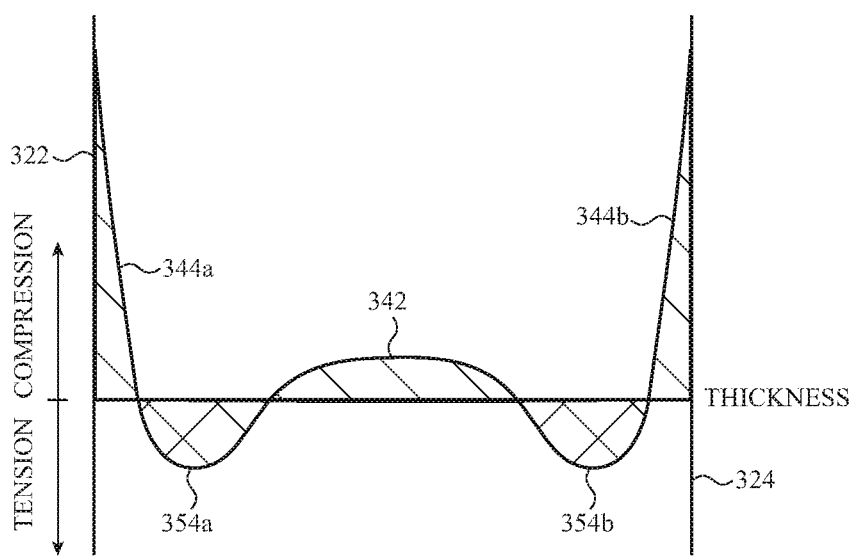
FIG. 3D shows an example of the variation of residual stress with position for the cover member of FIG. 3C.

FIG. 3D shows an example of the variation of residual stress with thickness for the cover member 320 of FIG. 3C. The cover member 320 includes an internal compressive stress region 342 inward from first and second internal tensile stress regions 354a and 354b. First and second internal tensile stress regions 354a and 354b are inward from first and second external compressive stress regions 344a and 344b. The first and the second external compressive stress regions 344a, 344b may be substantially similar or may differ. The first and the second internal tensile stress regions 354a, 354b may also be substantially similar or may differ. As shown in FIG. 3D, a level of the compressive stress is greater in external compressive stress regions 344a, 344b than in internal compressive stress region 342. In embodiments, a maximum level of the compressive stress in the external compressive stress regions 344a, 344b may be from 3 to 10 times or from 5 to 10 times a maximum level of the compressive stress in the internal compressive stress regions. In embodiments, the surface compressive stress of each of external compressive stress regions 344a and 344b may be from 400 MPa to 800 MPa or from 600 MPa to 800 MPa. As shown in FIG. 3D, thickness of the internal compressive stress region 342 may be greater than a depth of the external compressive stress region 344. In embodiments, the depth of each of the first and the second compressive stress regions 344a and 344b may be from 5 microns to 50 microns.

Figure 4A:
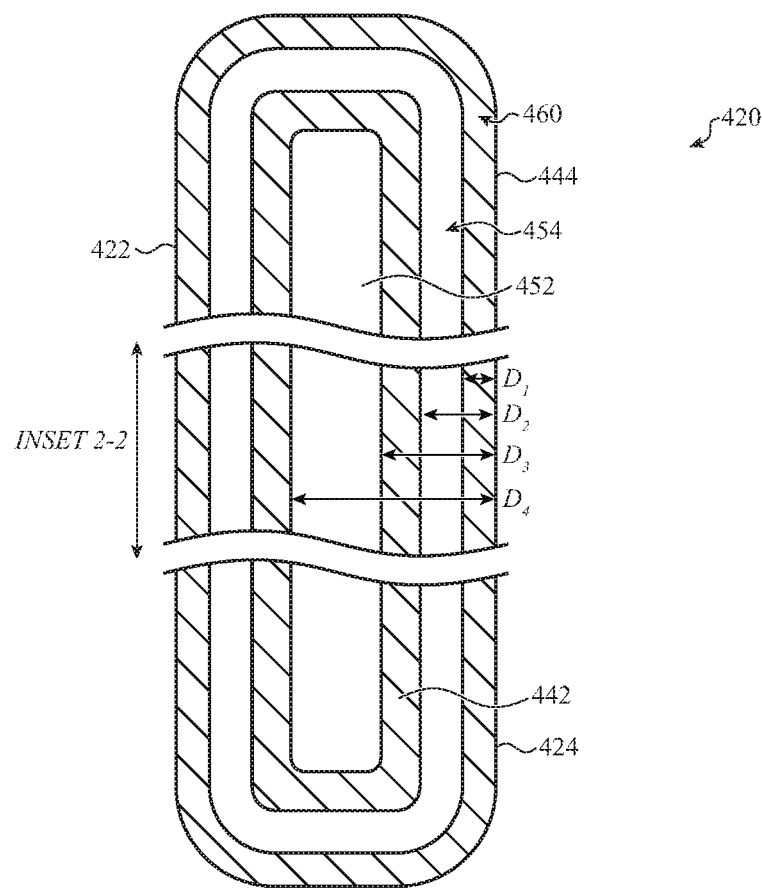
FIG. 4A shows a simplified cross-section view of an additional example cover member having internal and external regions of compressive stress.

FIG. 4A shows a simplified cross-section view of another example cover member 420 having an internal and an external compressive stress region. The cover member 420 includes an internal compressive stress region 442, external compressive stress region 444, and internal tensile stress regions 452 and 454.

As shown in FIG. 4A, external compressive stress region 444 extends from front surface 422 and back surface 424 to a first depth $D_1$. As shown, the depth of the external compressive stress region 444 may be substantially equal around the cover member 420. In further embodiments, the external compressive stress region 444 may vary around the cover member 420. For example, a first external compressive stress region may be formed along a first external surface of the cover member and a second external compressive stress region may be formed along a second external surface of the cover member. The second external surface may be generally opposite to the first external surface. For example, the first external surface may correspond to front surface 422 and the second external surface may correspond to back surface 424. The external compressive stress region 444 may take the form of a layer and be referred to as an external compressive stress layer.

The cover member 420 further includes internal tensile stress region 454. As shown, internal tensile stress region 454 is located inward from external compressive stress region 444. Internal tensile stress region 454 is also located between external compressive stress region 444 and internal compressive stress region 442. The internal tensile stress region 454 may extend from the first depth $D_1$ to a second depth $D_2$. The internal tensile stress region 454 may take the form of a layer and be referred to as an internal tensile stress layer.

The cover member 420 further includes internal compressive stress region 442. As shown, the internal compressive stress region 442 is inward from internal tensile stress region 454. As shown, the internal compressive stress region 442 extends from the second depth $D_2$ to a third depth $D_3$. The internal compressive stress region 442 may take the form of a layer and be referred to as an internal compressive stress layer.

The cover member 420 further includes internal tensile stress region 452. As shown, internal tensile stress region 452 is located inward from internal compressive stress region 442. The internal tensile stress region 452 may take the form of a layer and be referred to as an internal tensile stress layer.

Figure 4B:
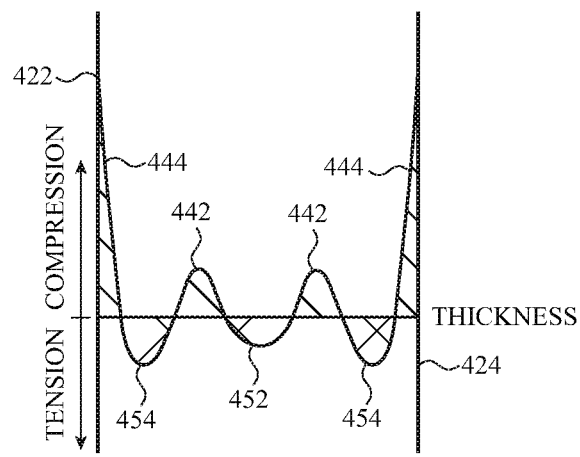
FIG. 4B shows an example of the variation of residual stress across the thickness for the cover member of FIG. 4A.

FIG. 4B shows an example of the variation of residual stress with thickness for the cover member 420 of FIG. 4A. The cover member 420 includes an internal tensile stress region 452, an internal compressive stress region 442, internal tensile stress region 454, and an external compressive stress region 444. As shown in FIG. 4B, a level of the compressive stress is greater in external compressive stress region 444 than in internal compressive stress region 442.

Figure 4C:
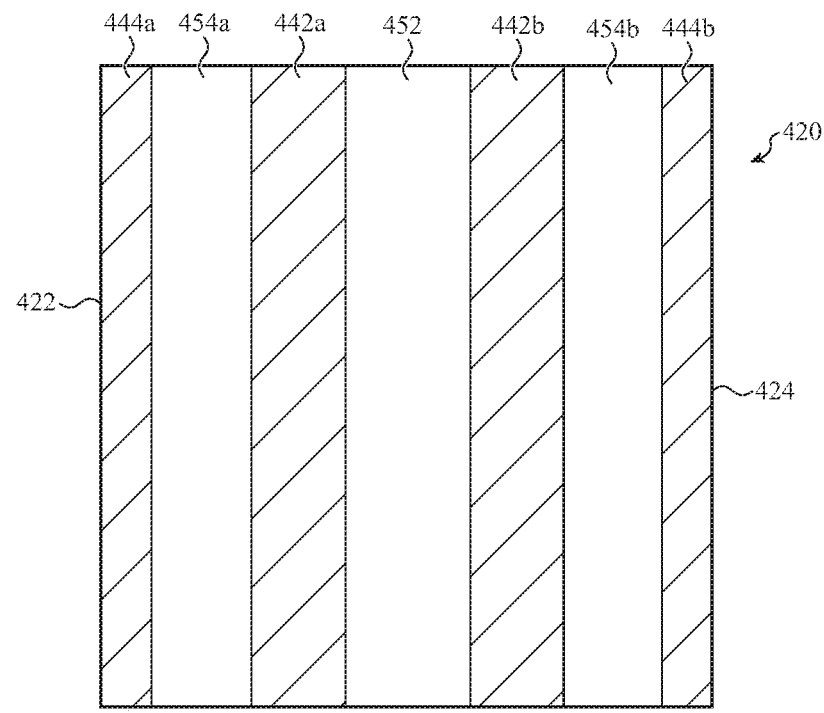
FIG. 4C shows a simplified cross-section view of a further example cover member having internal and external regions of compressive stress.

FIG. 4C shows a partial cross-section of another cover member 420 including an internal compressive stress region and first and second external compressive stress regions. The first external compressive stress region 444a is formed along front surface 422 and the second external compressive stress region 444b is formed along back surface 424. The cover member 420 further comprises a first internal tensile stress region 454a inward from the first internal compressive stress region 444a and a second internal tensile stress region 454b inward from the second external compressive stress region 444b. In addition, the cover member 420 comprises a first internal compressive stress region 442a inward from the first internal tensile stress region 454a and a second internal compressive stress region 442b inward from the second internal tensile stress region 454b. Third internal tensile stress region 452 may also be inward from both first internal compressive stress region 442a and second internal compressive stress region 442b.

Figure 4D:
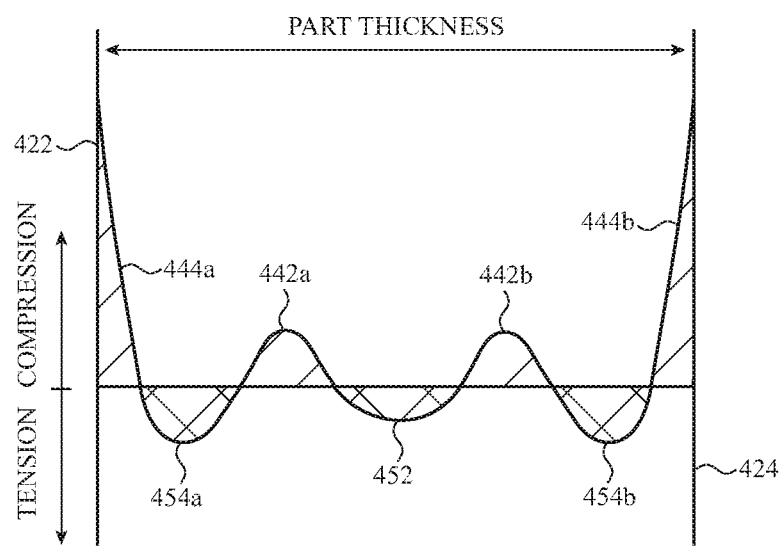
FIG. 4D shows an example of the variation of residual stress across the thickness for the cover member of FIG. 4C.

FIG. 4D shows an example of the variation of residual stress with thickness for the cover member 420 of FIG. 4C. The cover member 420 includes an internal tensile stress region 452 inward from internal compressive stress regions 442a and 442b. Internal compressive stress regions 442a and 442b are inward from internal tensile stress regions 454a and 454b and internal tensile stress regions 454a and 454b area are inward from external compressive stress regions 444a and 444b. As shown in FIG. 4D, a level of the compressive stress is greater in external compressive stress regions 444a, 444b than in internal compressive stress regions 442a, 442b. In embodiments, a maximum level of the compressive stress in the external compressive stress regions 444a, 444b may be from 3 to 10 times or from 5 to 10 times a maximum level of the compressive stress in the internal compressive stress regions 442a, 442b. In embodiments, the surface compressive stress of each external compressive stress regions 444a, 444b may be from 400 MPa to 800 MPa or from 600 MPa to 800 MPa. A thickness of the internal compressive stress region 442a, 442b may be greater than a depth of the external compressive stress regions 444a, 444b. In embodiments, the depth of each of the external compressive stress regions 444a, 444b may be from 5 microns to 50 microns.

In embodiments, an ion exchange process may create an internal compressive stress region in a component. For example, alkali metal ions in a glass portion of the component may be exchanged for larger alkali metal ions at a temperature below the strain point of the glass. The ion exchange process may also create an external compressive stress region along an external surface of the component and an internal tensile stress region inward from the external compressive stress region. The internal compressive stress region is inward from the internal tensile stress region. In further embodiments, the component further comprises another internal tensile stress region inward from the internal compressive stress region.

For example, the component may comprise an external compressive stress region including third alkali metal ions having a third size, an internal tensile stress region including first alkali metal ions having a first size, and an internal compressive stress region including second alkali metal ions having a second size. The second alkali metal ions and the third alkali metal ions may be introduced into the component by ion exchange. The second size may be greater than the first size and the third size may be greater than the second size. Further, the external compressive stress region may be enriched in the third alkali metal ions compared to the internal tensile stress region and the internal compressive stress region may be enriched in the second alkali metal ions as compared to the internal tensile stress region. In embodiments, the internal compressive stress region, although enriched in the second alkali metal ions, further comprises the first metal alkali metal ions.

As an additional example, a strengthened glass component may comprise a first and a second external compressive stress region, the first external compressive stress region along a first external surface and the second external compressive stress region along a second external surface. The first and the second external compressive stress regions each include third alkali metal ions having a third size. The strengthened glass component further comprises a first and a second internal tensile stress region, the first internal tensile stress region inward from the first external compressive stress region and the second internal tensile stress region inward from the second external compressive stress region. The first and the second internal tensile stress region each include first alkali metal ions having a first size. The strengthened glass component further comprises an internal compressive stress region inward from the first and the second internal tensile stress regions. The internal compressive stress region includes second alkali metal ions having a second size.

As a further example, the internal compressive stress region may be a first internal compressive stress region and the component may further comprise a second internal compressive stress region and a third internal tensile stress region. The third internal tensile stress region comprises the first alkali metal ions and the first and the second internal compressive stress regions are enriched in the second alkali metal ions as compared to the first, second, and third internal tensile stress regions. In embodiments, the first and second internal compressive stress regions, although enriched in the second alkali metal ions, further comprise the first metal alkali metal ions. The second size may be greater than the first size and the third size may be greater than the second size.

In embodiments, the component includes an ion exchangeable glass or glass ceramic. Ion exchangeable glasses include, but are not limited to, soda lime glasses, aluminosilicate glasses, and aluminoborosilicate glasses. Ion exchangeable glass ceramics include, but are not limited to, aluminosilicate glass ceramics and aluminoborosilicate glass ceramics.

Figure 5A:
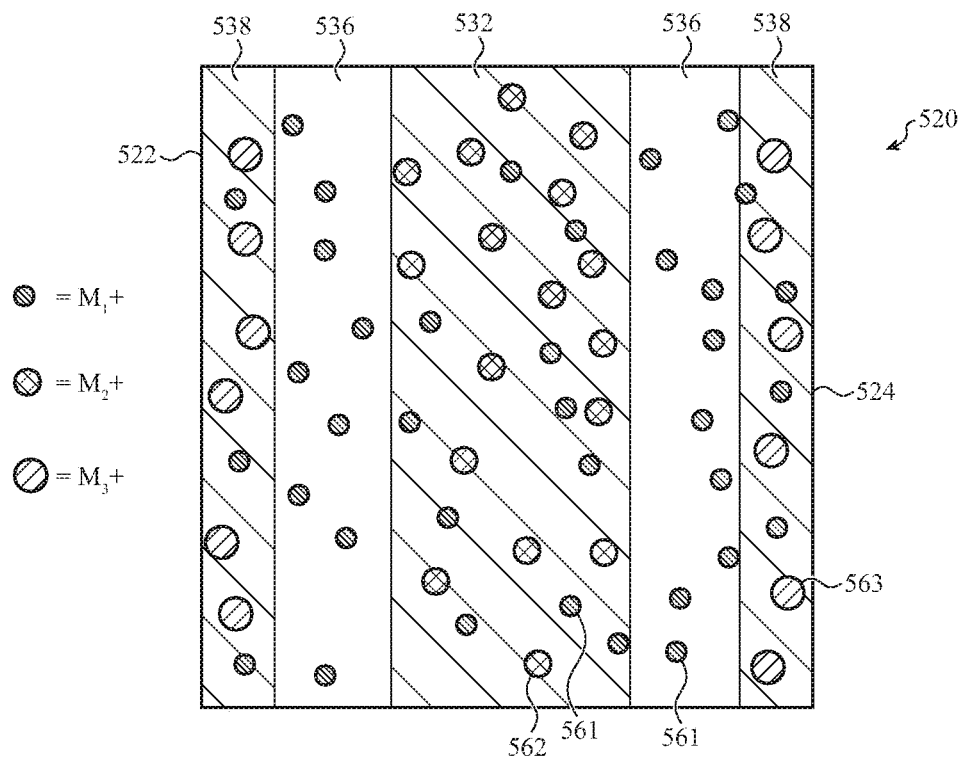
FIG. 5A shows a detailed view of an example glass cover member having an internal compressive stress region created at least in part by an ion exchange process.

FIG. 5A shows a detailed view of the inset 1-1 of FIG. 3A for an example glass cover member 520 having an internal compressive stress region created at least in part by an ion exchange process. The glass cover member 520 comprises an outer portion 538, portion 536 inward from outer portion 538, and inner portion 532 inward from portion 536. As shown in FIG. 5A, inner portion 532 may be centrally located. A first part of outer portion 538 is adjacent front surface 522; a second part of outer portion 538 is adjacent back surface 524. The side surface of the cover member is not shown in this field of view. The alkali metal ions present in the glass cover member are schematically illustrated, but the glass network is not shown.

Prior to the ion exchange process, the cover member may be an ion exchangeable glass comprising first alkali metal ions 561. As schematically shown in FIG. 5A, inner portion 532 of the cover member 520 includes first alkali metal ions 561 and second alkali metal ions 562. The first alkali metal ions 561 have a first size and the second alkali metal ions 562 have a second size greater than the first size. The second alkali metal ions 562 may have been introduced by the ion exchange process. Inner portion 532 is enriched in the second alkali metal ions 562 as compared to portion 536. The inner portion 532 may also be enriched in the second alkali metal ions 562 as compared to portion 538.

Portion 536 of the cover member 520 includes first alkali metal ions 561. Portion 536 may be depleted of the second alkali metal ions 562 and enriched in the first alkali metal ions 561 as compared to inner portion 532. The portion 536 may also be enriched in the first alkali metal ions 561 as compared to portion 538. The first alkali metal ions may comprise first alkali metal ions present in the glass prior to the ion exchange process and additional first alkali metal ions introduced during the ion exchange process.

Outer portion 538 of the cover member 520 comprises third alkali metal ions 563 having a third size greater than the first size and is enriched in the third alkali metal ions 563 as compared to portion 536. Outer portion 538 may also be enriched in the third alkali metal ions 563 as compared to portion 532. The second alkali metal ions 562 and the third alkali metal ions 563 may have been introduced by the ion exchange process. Outer portion 538 may further include first alkali metal ions 561. The first alkali metal ions 561 may comprise first alkali metal ions present in the glass prior to the ion exchange process and additional first alkali metal ions introduced during the ion exchange process.

As an example, the first alkali metal ions 561 ($M_1^+$) are lithium ions, the second alkali metal ions 562 ($M_2^+$) are sodium ions, and the third alkali metal ions 563 ($M_3^+$) are potassium ions. In embodiments, the outer portion 538 of the cover is enriched in potassium ions and the inner portion 532 is enriched in sodium ions as compared to the portion 536.

Figure 5B:
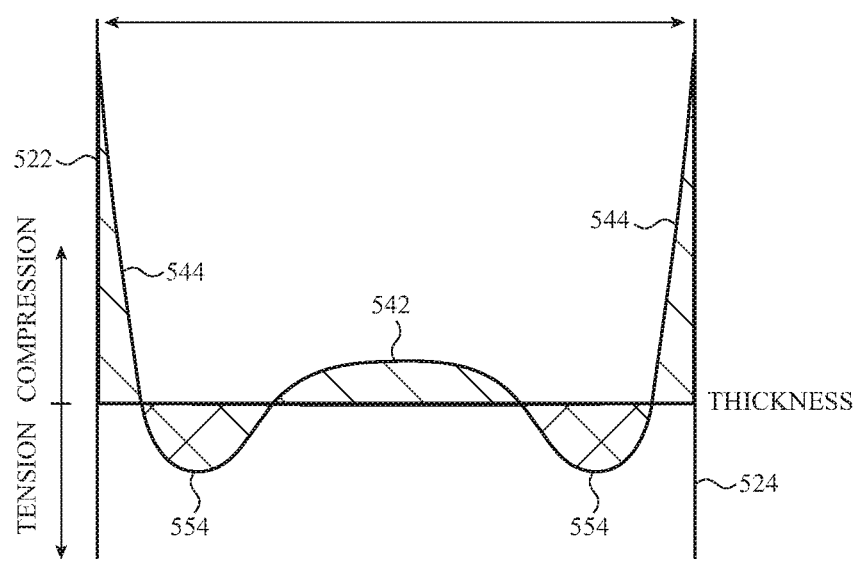
FIG. 5B shows an example of the variation of residual stress across the thickness for the glass cover member of FIG. 5A.

FIG. 5B shows an example of the variation of residual stress along the thickness of the glass cover member 520 of FIG. 5A. The glass cover member 520 includes internal compressive stress region 542. Internal compressive stress region 542 may be located in inner portion 532 of the glass cover member 520 and created because inner portion 532 is enriched in the second alkali metal ions as compared to portion 536.

The glass cover member 520 further includes external compressive stress region 544. External compressive stress region 544 may be located in outer portion 538 of the glass cover member 520 and created because outer portion 538 is enriched in the third alkali metal ions 563 as compared to portion 536. As shown in FIG. 5B, a level of the compressive stress is greater in external compressive stress region 544 than in internal compressive stress region 542.

The glass cover member 520 further comprises internal tensile stress region 554 between external compressive stress region 544 and internal compressive stress region 542. The tensile stress in internal tensile stress region 554 at least partially balances the compressive stress in the glass cover member 520. Internal tensile stress region 554 is at least partially located in portion 536 of the glass cover member 520. In some embodiments, the internal tensile stress region 554 may extend slightly into inner portion 532 and/or outer portion 538 of the glass cover member 520.

Therefore, the internal compressive stress region 542 of the glass cover member 520 of FIGS. 5A-5B may comprise first alkali metal ions 561 and second alkali metal ions 562 and may be enriched in the second alkali metal ions 562 as compared to internal tensile stress region 554. Internal tensile stress region 554 may comprise first alkali metal ions 561. Second alkali metal ions 562 and/or third alkali metal ions 563 may be present in internal tensile stress region 554, but to a lesser amount as compared to the external compressive stress region 544 and the internal compressive stress region 542. External compressive stress region 544 may comprise first alkali metal ions 561 and third alkali metal ions 563 and may be enriched in the third alkali metal ions 563 as compared to internal tensile stress region 554.

Figure 6:
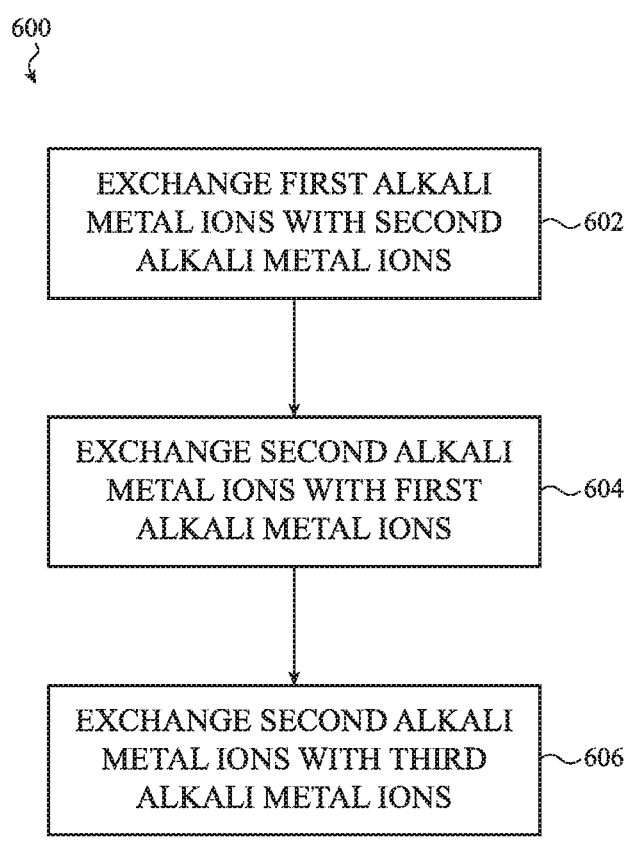
FIG. 6 shows a flowchart of a process for making the glass cover member of FIGS. 5A and 5B according to one embodiment.

FIG. 6 illustrates a flowchart of an example process 600 for making an internal compressive stress region in a component using multiple ion exchange operations. Process 600 further creates an external compressive stress region and an internal tensile stress region. For example, process 600 may be used to form the glass cover member of FIGS. 5A-5B.

Process 600 includes multiple ion exchange operations. During each ion exchange operation, alkali metal ions in the component may be exchanged for alkali metal ions in a bath. Alkali metal ions from the bath are thus introduced into the component. The bath may comprise a molten ionic salt. The bath temperature may be from the melting point of the salt to approximately 600° C.

The temperature of the bath may be below a strain point or a glass transition point of a glass portion of the component, so that exchanging the alkali metal ions in the component with larger alkali metal ions tends to cause an expansion of an ion-exchanged portion of the component. However, expansion of the ion-exchanged portion of the component may be constrained by other portions of the component which are not ion exchanged. As a result, a compressive stress region, such as a biaxial residual compressive stress region, may be created in the ion-exchanged portion. For example, the ion-exchanged portion may be in the form of an ion-exchanged layer.

The process 600 may include operation 602 of exchanging first alkali metal ions in an ion exchangeable portion of the component with second alkali metal ions. The first alkali metal ions have a first size and the second alkali metal ions have a second size larger than the first size. The first alkali metal ions may be exchanged for the second alkali metal ions by immersing the component in a bath comprising the second alkali metal ions. The second alkali metal ions are thus introduced into the component.

For example, operation 602 may be a first ion exchange operation which forms a first ion exchange layer which extends throughout a thickness of the glass component. As another example, the first ion exchange layer may extend to a first exchange depth which is less than half a thickness of the glass component. For example, the first alkali metal ions may be lithium ions, the second alkali metal ions may be sodium ions, and the first ion exchange layer may comprise sodium ions which have been introduced into the glass via the first ion exchange operation. FIG. 7B schematically illustrates an example distribution of the first and second alkali metal ions after operation 602.

The process 600 may further include operation 604 of exchanging second alkali metal ions in the component with first alkali metal ions. Operation 604 may follow operation 602. Operation 604 may be a second ion exchange which forms a second ion exchange layer. The second ion exchange layer extends to a second exchange depth less than the first exchange depth. The second ion exchange may comprise immersing the component in a bath comprising the first alkali metal ions. First alkali metal ions may thus be re-introduced into the component. For example, the second ion exchange layer may be depleted of sodium ions and enriched in lithium ions as compared to the first ion exchange layer.

In addition, process 600 may include operation 606 of exchanging second alkali metal ions in the component with third alkali metal ions. Operation 606 may further include exchanging first alkali metal ions in the component with the third alkali metal ions. Ion exchange operation 606 may be a third ion exchange which forms a third ion exchange layer. The third ion exchange layer extends to a third exchange depth less than the second exchange depth. Operation 606 may comprise immersing the component in a bath comprising the third alkali metal ions. Operation 606 may follow operation 604 or may occur concurrently with operation 604, in which case the bath may comprise the first alkali metal ions and the third alkali metal ions. For example, the third alkali metal ions may be potassium ions and the third ion exchange layer may be enriched in potassium ions as compared to the second ion exchange layer. FIG. 7B schematically illustrates an example distribution of the first, second, and third alkali metal ions after operations 604 and 606.

Figure 7A:
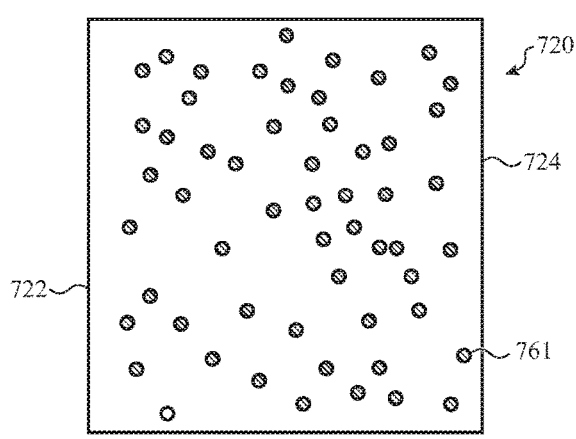
FIGS. 7A, 7B, and 7C illustrate stages in the process of FIG. 6.
Figure 7B:
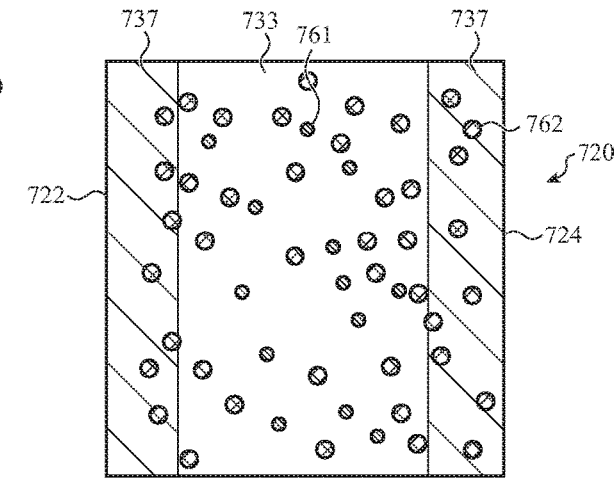
Figure 7C:
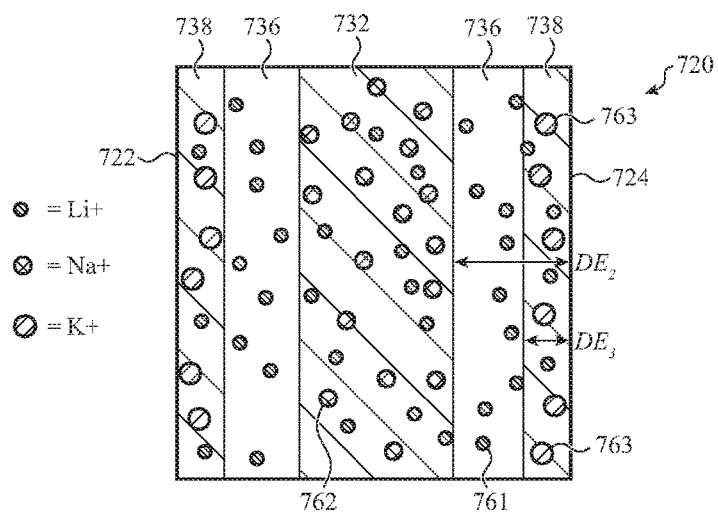

FIGS. 7A, 7B, and 7C schematically illustrate three stages in an example process for creating an internal compressive stress region in a glass cover using multiple ion exchange operations. FIG. 7A shows a detailed view of a part of a glass cover member 720 prior to the first ion exchange. The glass cover member 720 comprises first alkali metal ions 761 distributed across the thickness of the glass cover member 720. The field of view of FIGS. 7A-7C shows front surface 722 and back surface 724, but not the side surface of the glass cover member.

FIG. 7B shows the glass cover member 720 of FIG. 7A following an exchange of at least some of the first alkali metal ions 761 with second alkali metal ions 762 having a second size greater than the first size. For example, FIG. 7B may show the glass cover member after operation 602 of process 600. As shown, the first ion exchange occurs throughout the thickness of the glass cover member 720. However, a greater amount of exchange occurs near front surface 722 and back surface 724, so that the glass cover member 720 is depleted of the first alkali metal ions 761 and enriched in the second alkali metal ions 762 near the front surface 722 and the back surface 724. For example, the glass cover member 720 may be substantially depleted of first alkali metal ions 761 in portion 737 of the glass cover member 720. A remainder portion 733 of the glass cover member 720 comprises the first alkali metal ions 761 and the second alkali metal ions 762.

FIG. 7C shows the glass cover member 720 of FIG. 7B after a second and a third ion exchange which occur concurrently. For example, FIG. 7C may show the glass cover member after operations 604 and 606 of process 600. During the second ion exchange, at least some of the second alkali metal ions 762 are exchanged for first alkali metal ions 761 to a second exchange depth $DE_2$ less than half the thickness of the glass cover member 720. During the third ion exchange, at least some third alkali metal ions 763 having a third size larger than the second size are exchanged for second alkali metal ions 762, first alkali metal ions 761, or a combination thereof to third exchange depth $DE_3$ which is less than $DE_2$. For example, the glass cover member 720 may be immersed in a bath comprising the first alkali metal ions 761 and the third alkali metal ions 763 to achieve the second and third ion exchanges.

As a result, inner portion 732 of the glass cover member 720 comprises the first alkali metal ions 761 and the second alkali metal ions 762. Portion 736 comprises the first alkali metal ions 761 and is depleted of the second alkali metal ions 762 as compared to inner portion 732. Outer portion 738 of the glass cover member 720 comprises the third alkali metal ions 763 and the first alkali metal ions 761 and is enriched in the third alkali metal ions 763 as compared to portion 736. The composition profile of FIG. 7C can produce an internal compressive stress region in portion 732, as previously discussed with respect to FIGS. 5A and 5B.

Figure 8A:
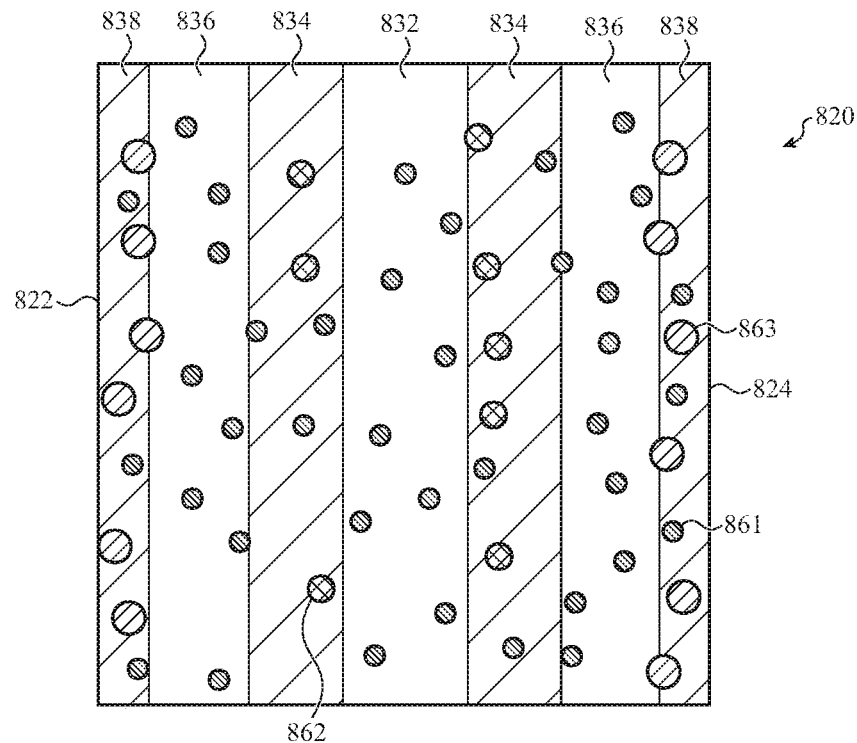
FIG. 8A shows a detailed view of another example glass cover member having an internal compressive stress region created at least in part by an ion exchange process.

FIG. 8A shows a detailed view of the inset 2-2 of FIG. 4A for an example glass cover member 820 having internal compressive stress regions created at least in part by an ion exchange process. The glass cover member 820 comprises outer portion 838, portion 836 inward from outer portion 838, portion 834 inward from portion 836, and inner portion 832. A first part of outer portion 838 is adjacent front surface 822; a second part of outer portion 838 is adjacent back surface 824. The side surface of the glass cover member 820 is not shown in this field of view. Prior to the ion exchange process, the glass cover member 820 may comprise an ion exchangeable glass comprising first alkali metal ions 861.

As shown in FIG. 8A, an inner portion 832 of the glass cover member 820 comprises first alkali metal ions 861 after the ion exchange process. The first alkali metal ions 861 may comprise first alkali metal ions 861 present in the glass prior to the ion exchange process. The first alkali metal ions 861 have a first size.

Portion 834 of the glass cover member 820 comprises first alkali metal ions 861 and second alkali metal ions 862. The second alkali metal ions 862 have a second size greater than the first size. The second alkali metal ions 862 may have been introduced by the ion exchange process. Portion 834 is enriched in the second alkali metal ions 862 and depleted of the first alkali metal ions 861 as compared to portion 832. Portion 834 may also be enriched in the second alkali metal ions 862 as compared to portion 836.

Portion 836 of the glass cover member 820 comprises first alkali metal ions 861. Portion 836 may be depleted of the second alkali metal ions 862 and enriched in the first alkali metal ions 861 as compared to portion 834. Portion 836 may also be enriched in the first alkali metal ions 861 as compared to portion 838. The first alkali metal ions 861 may comprise first alkali metal ions 861 present in the glass prior to the ion exchange process and additional first alkali metal ions 861 introduced during the ion exchange process.

Outer portion 838 of the glass cover member 820 comprises first alkali metal ions 861 and third alkali metal ions 863 having a third size greater than the first size. Outer portion 838 is enriched in the third alkali metal ions 863 as compared to portion 836. Outer portion 838 may also be enriched in the third alkali metal ions 863 as compared to portions 834 and 832.

As an example, the first alkali metal ions 861 ($M_1^+$) are lithium ions, the second alkali metal ions 862 ($M_2^+$) are sodium ions, and the third alkali metal ions 863 ($M_3^+$) are potassium ions. In embodiments, the outer portion 838 of the cover is enriched in potassium ions as compared to the portion 836 and the portion 834 is enriched in sodium ions as compared to the portions 832 and 836.

Figure 8B:
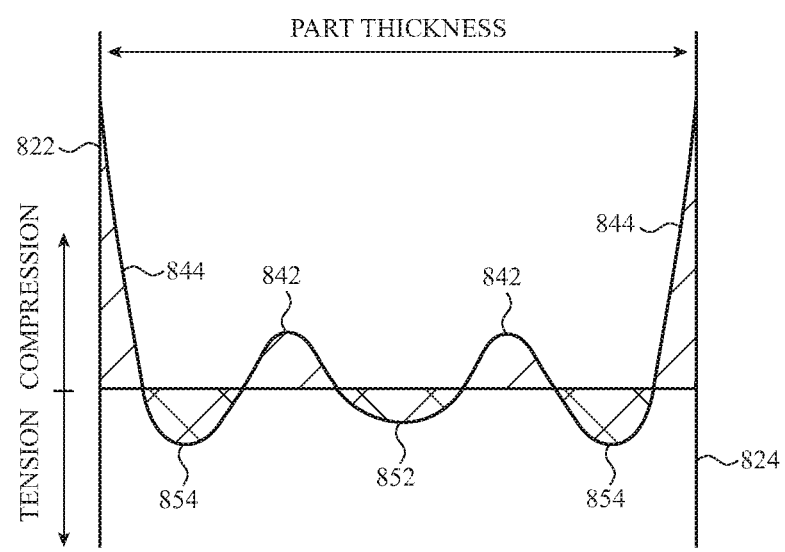
FIG. 8B shows an example of variation of residual stress across the thickness for the glass cover member of FIG. 8A FIGS. 9A, 9B, and 9C illustrate stages in a process for making the glass cover member of FIGS. 8A and 8B.

FIG. 8B shows an example of the variation of residual stress along the thickness of the glass cover member 820 of FIG. 8A. The glass cover member 820 includes internal compressive stress region 842. Internal compressive stress region 842 may be located in portion 834 of the glass cover member 820 and created because portion 834 is enriched in the second alkali metal ions 862 as compared to portion 836 and inner portion 832.

The glass cover member 820 further includes external compressive stress region 844. External compressive stress region 844 may be located in outer portion 838 of the glass cover member 820 and created because outer portion 838 is enriched in the third alkali metal ions 863 as compared to portion 836. As shown in FIG. 8B, a level of the compressive stress is greater in external compressive stress region 844 than in internal compressive stress region 842.

The glass cover member 820 further comprises internal tensile stress region 854 between external compressive stress region 844 and internal compressive stress region 842. The tensile stress in internal tensile stress region 854 at least partially balances the residual compressive stress in the glass cover member 820. Internal tensile stress region 854 is at least partially located in portion 836 of the glass cover member 820. In some embodiments, internal tensile stress region 854 may extend slightly into inner portion 832 and/or outer portion 838 of the glass cover member. The glass cover member 820 further comprises internal tensile stress region 852 inward from internal compressive stress region 842. The tensile stress in internal tensile stress region 852 at least partially balances compressive stress in the glass cover member 820 and is at least partially located in inner portion 832 of the glass cover member 820.

Therefore, the internal compressive stress region 842 of the glass cover member 820 of FIGS. 8A-8B may include second alkali metal ions and may be enriched in the second alkali metal ions as compared to internal tensile stress regions 854 and 852. Internal tensile stress regions 854 and 852 may include first alkali metal ions. Internal compressive stress region 842 may further include first alkali metal ions, but may be depleted in the first alkali metal ions as compared to internal tensile stress regions 854 and 852.

External compressive stress region 844 may comprise third alkali metal ions and may be enriched in the third alkali metal ions as compared to internal tensile stress region 854. External compressive stress region 844 may further comprise first alkali metal ions, but may be depleted in the first alkali metal ions as compared to internal tensile stress region 854.

Figure 9A:
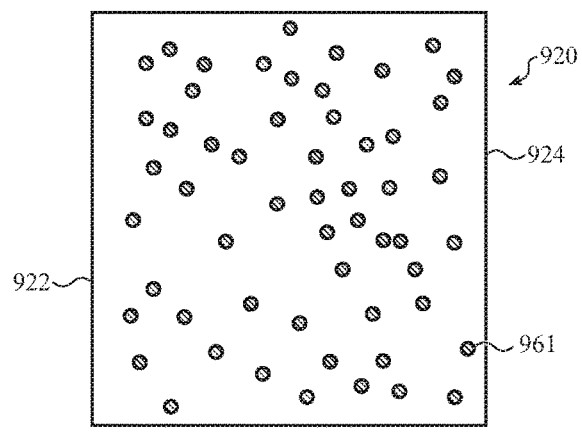
Figure 9B:
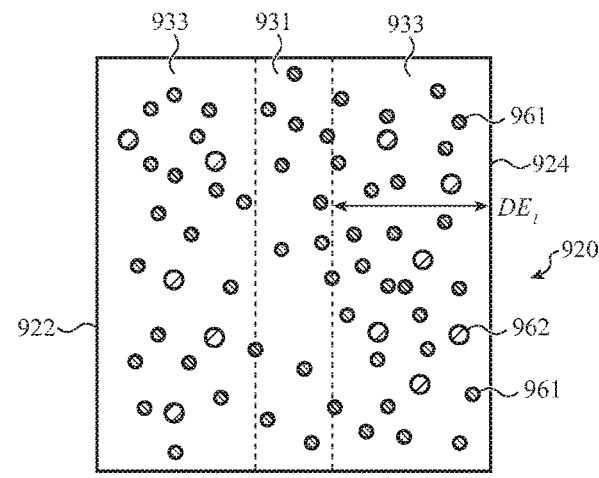
Figure 9C:
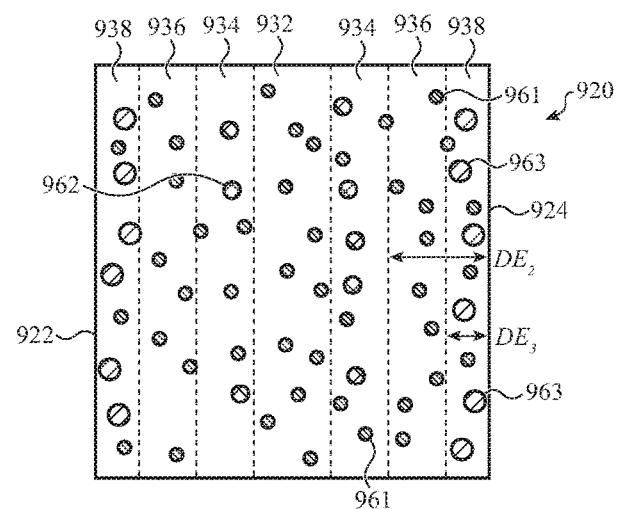

FIGS. 9A, 9B, and 9C schematically illustrate three stages in an example process for creating an internal compressive stress region in a component using multiple ion exchange operations. For example, the process may be used to produce the component of FIGS. 8A and 8B. FIG. 9A shows the glass cover member 920 prior to ion exchange; the glass cover member 920 comprises first alkali metal ions 961 distributed across the thickness of the glass cover member 920. The field of view of FIGS. 9A-9C shows front surface 922 and back surface 924 of the glass cover member 920, but not the side surface.

FIG. 9B shows the glass cover member 920 after a first ion exchange. During the first ion exchange at least some of the first alkali metal ions 961 are exchanged with second alkali metal ions 962 having a second size greater than the first size to a first ion exchange depth $DE_1$ less than half the thickness of the glass cover member 920. As shown, the exchange does not occur throughout the thickness of the glass cover member 920 but occurs in portions 933. A greater amount of exchange occurs near front surface 922 and back surface 924, so that the glass cover member 920 is depleted of the first alkali metal ions 961 and enriched in the second alkali metal ions 962 near the front surface 922 and the back surface 944. A remainder portion 931 of the glass cover member 920 is not substantially ion exchanged and comprises the first alkali metal ions 961, but comprises few, if any, of the second alkali metal ions 962.

FIG. 9C shows the glass cover member 920 after a second and a third ion exchange which occur concurrently. During the second ion exchange, at least some of the second alkali metal ions 962 are exchanged for first alkali metal ions 961 to a second exchange depth $DE_2$ less than the first ion exchange depth $DE_1$. During the third ion exchange, at least some of the third alkali metal ions 963 having a third size larger than the second size are exchanged for second alkali metal ions 962, first alkali metal ions 961, or a combination thereof to a third exchange depth $DE_3$ which is less than $DE_2$. For example, the glass cover member 920 may be immersed in a bath comprising the first alkali metal ions 961 and the third alkali metal ions 963 to achieve the desired ion exchange.

As a result, inner portion 932 of the glass cover member 920 comprises the first alkali metal ions 961. Portion 934 of the glass cover member 920 comprises the first alkali metal ions 961 and the second alkali metal ions 962. Portion 936 comprises the first alkali metal ions and is depleted of the second alkali metal ions as compared to portion 934. Outer portion 938 of the glass cover member 920 comprises the third alkali metal ions 963 and the first alkali metal ions 961 and is enriched in the third alkali metal ions 963 as compared to portion 936. The composition profile of FIG. 9C can produce an internal compressive stress region within portion 934, as previously discussed with respect to FIGS. 8A and 8B.

In embodiments, crystallizing an internal portion of a glass component to form a glass ceramic can create an internal compressive stress region in the component. Selective crystallization of an internal portion of a glass component can create an internal glass ceramic portion having different properties than external portions of the cover member and an internal compressive stress region in the internal glass ceramic portion. For example, if the crystals have a lower coefficient of thermal expansion than the glass from which they are formed, the internal glass ceramic portion of the component tends to contract less than the external glass portions when cooled from a crystallization temperature. As a result, compressive stresses can form in the internal glass ceramic portion of the component. The glass component may be ion exchangeable as well as crystallizable.

As an example, a component comprises an internal compressive stress region located in the internal glass ceramic portion. The component further comprises an external compressive stress region along an external surface of the component and an internal tensile stress region inward from the external compressive stress region. The external compressive stress region can be formed by an ion exchange operation in the external glass portion of the component.

The external portions of the component may each include a sufficiently low volume of crystals to be considered a glass. The external glass portion of the component may comprise first alkali metal ions. The external compressive stress region may include second alkali metal ions having a second size greater than the first size. The second alkali metal ions may have been introduced by an ion exchange operation. The internal compressive stress region may include the first alkali metal ions. For example, the first alkali metal ions may be lithium ions and the second alkali ions may be potassium ions.

As another example, a strengthened glass component comprises an internal glass ceramic portion, a first external glass portion, and a second external glass portion. The first external glass portion and the second external glass portion may each comprise an aluminosilicate or an aluminoborosilicate glass including first alkali metal ions having a first size. For example, the first alkali metal ions may be lithium ions.

The strengthened glass component may comprise a first and a second external compressive stress region, the first external compressive stress region along a first external surface and the second external compressive stress region along a second external surface. The first external compressive stress region is located in the first external glass portion and the second external compressive stress region is located in the second external glass portion. The first and the second external compressive stress regions can be formed by an ion exchange operation to introduce second alkali metal ions in the first and second external glass portions of the component. For example, the second alkali metal ions may be potassium ions.

The strengthened glass component may further comprise a first and a second internal tensile stress region, the first internal tensile stress region inward from the first external compressive stress region and the second internal tensile stress region inward from the second external compressive stress region. The first and second internal tensile stress regions may each include first alkali metal ions having a first size.

The strengthened glass component may further comprise an internal compressive stress region inward from the first and the second internal tensile stress regions. The internal compressive stress region includes the glass ceramic. The internal compressive stress region may also include the first alkali metal ions.

In embodiments, the glass component is capable of crystallization to form an internal glass ceramic portion. For example, the glass may be an aluminosilicate glass capable of forming an aluminosilicate glass ceramic or a boroaluminosilicate glass capable of forming a boroaluminosilicate glass ceramic. For example, the glass ceramic may be a lithium aluminosilicate (LAS). In embodiments, the internal glass ceramic portion may include a residual glass phase and crystals of one or more crystalline phases. The volume percentage of the crystals may be low enough to prevent cracking of the residual glass phase during cooling of the glass ceramic to room temperature (e.g., about 20° C.) but high enough to create a residual compressive stress. The crystals may be small enough so that the cover member remains transparent to visible radiation.

Figure 10A:
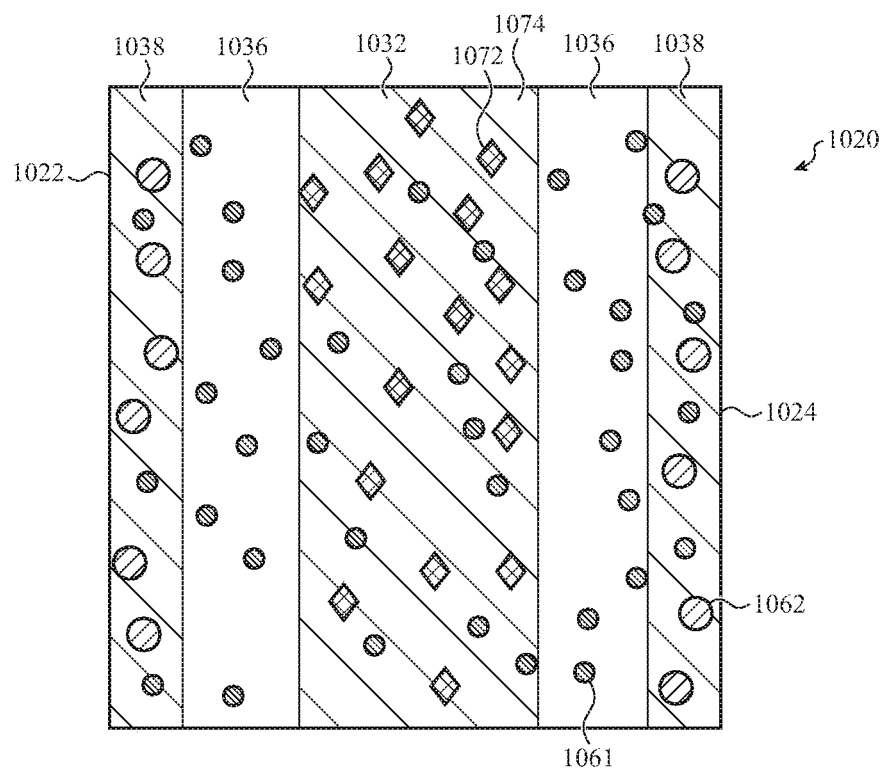
FIG. 10A shows a detailed view of an example cover member having an internal compressive stress region created at least in part by crystallizing a portion of a glass cover member to form a glass ceramic portion.

FIG. 10A shows a detailed view of the inset 1-1 of FIG. 3A for an example cover member having an internal compressive stress region created at least in part by forming an internal glass ceramic portion within the cover member. The cover member 1020 comprises internal glass ceramic portion 1032; portion 1032 comprises a glass ceramic. The glass ceramic may include a residual glass phase and one or more crystalline phases. Crystals 1072 in FIG. 10A represent the crystalline phase; the crystals 1072 are not necessarily shown to scale. In an embodiment, the glass ceramic includes first alkali metal ions 1061 having a first size. For convenience, first alkali metal ions 1061 having a first size are shown in the residual glass phase 1074. However, first alkali metal ions 1061 may also be present in the crystals 1072.

As examples, glass ceramic portion 1032 may have a volume percentage of crystals 1072 greater than or equal to 30% and less than 100%, greater than or equal to 50% and less than 100%, or greater than or equal to 75% and less than 100%. The crystals 1072 may have an average size of less than about 50 nm to provide transparency to visible radiation.

In embodiments, the glass ceramic is an aluminosilicate glass ceramic or an aluminoborosilicate glass ceramic. The residual glass portion may be an aluminosilicate glass or an aluminoborosilicate glass. As an example, the glass from which the glass ceramic is formed may be a lithium aluminosilicate glass and the glass ceramic may be a lithium aluminosilicate glass ceramic. Lithium aluminosilicate glasses can form several types of crystals, including β quartz solid solution crystals, β spodumene solid solution crystals, and keatite solid solution crystals. The resulting crystals may have a coefficient of thermal expansion which is close to zero or even less than zero.

The cover member 1020 of FIG. 10A also comprises an outer portion 1038 and portion 1036. Outer portion 1038 and portion 1036 may cooperate to form an external glass portion of the cover member. Both outer portion 1038 and portion 1036 may comprise a glass, such as an aluminosilicate or an aluminoborosilicate glass. The aluminosilicate or an aluminoborosilicate glass may include first alkali metal ions 1061 having a first size. Portion 1036 may include the first alkali metal ions 1061. Outer portion 1038 may further comprise second alkali metal ions 1062 having a second size. The second alkali metal ions 1062 may be introduced into the outer portion 1038 through an ion exchange process.

Figure 10B:
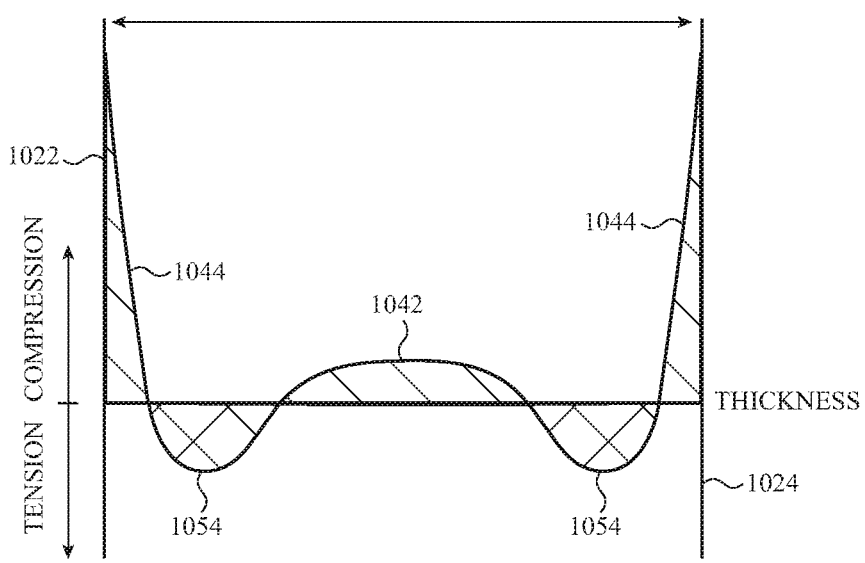
FIG. 10B shows an example of the variation of residual stress across the thickness in the sample for the cover member of FIG. 10A.

FIG. 10B shows an example of the variation of residual stress with position in the sample for the cover member 1020 of FIG. 10A. The cover member 1020 comprises external compressive stress region 1044 located along surfaces 1022 and 1024 The cover member 1020 further comprises an internal tensile stress region 1054 inward of external compressive stress region 1044. The cover member 1020 further comprises an internal compressive stress region 1042 inward of internal tensile stress region 1054.

External compressive stress region 1044 is in outer portion 1038 of the cover member 1020. The tensile stress in internal tensile stress region 1054 balances the residual compressive stress in the glass cover member 1020 and is at least partially located in portion 1036 of the cover member. In some embodiments, the internal tensile stress region 1054 may extend slightly into inner portion 1032 and/or outer portion 1038 of the cover member 1020. As shown in FIG. 10B, a level of the compressive stress is greater in external compressive stress region 1044 than in internal compressive stress region 1042. The internal compressive stress region 1042 is located in inner glass ceramic portion 1032.

Figure 11:
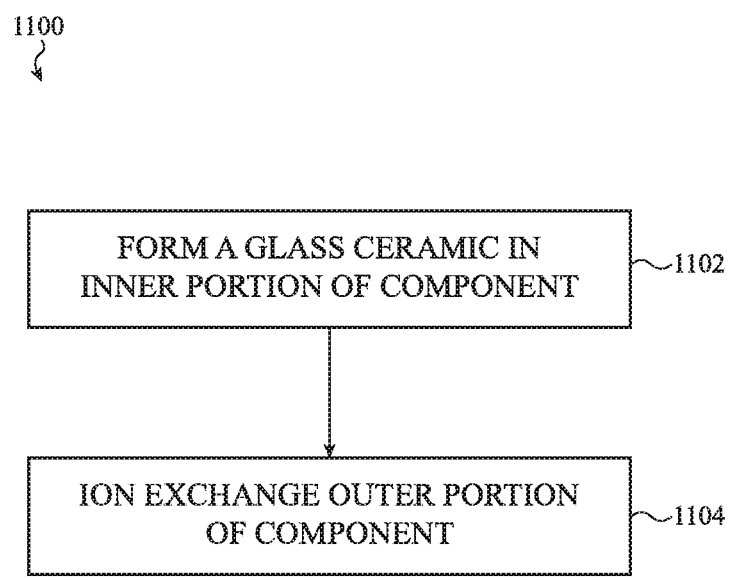
FIG. 11 shows a flowchart of a process for making the cover member of FIGS. 10A and 10B according to one embodiment.

FIG. 11 illustrates a flowchart of an example process 1100 for making an internal compressive stress region in a component using a combination of selective crystallization of a glass ceramic and ion exchange. Process 1100 further creates an external compressive stress region and an internal tensile stress region. For example, process 1100 may be used to form the glass cover member of FIGS. 10A-10B.

The process 1100 may include operation 1102 of forming a glass ceramic in an internal portion of a glass component. Operation 1102 includes the operation of forming crystals of the glass ceramic in the internal portion of the glass component. In embodiments, the operation of forming crystals of the glass ceramic may include the operation of creating crystal nuclei followed by the operation of growing the crystal nuclei to form crystals of a desired size. The operation of creating the crystal nuclei may comprise heating the internal portion of the glass component to a first temperature at which crystal nuclei form. The operation of growing the crystal nuclei may comprise heating the internal portion to a second temperature. The second temperature may be greater than the first temperature.

The internal portion of the glass component may be heated at least in part using a beam of radiation, such as a beam of light. For example, a laser may be used to heat the internal portion to a sufficient temperature to nucleate and/or grow crystals in the glass. An adjacent portion of the glass component may be heated to a lesser extent. For example, nucleation and/or growth of crystals in the adjacent portion of the glass component may occur to a lesser extent. For example, the volume percentage of crystals in the adjacent portion may be less than in the adjacent portion of the glass. For example, a volume percentage of crystals in the internal portion may be at least 25%, 50% or 75% higher than in an external portion of the component. The beam of radiation may be used in conduction with one or more additional heat sources (e.g., a furnace).

Process 1100 may further include operation 1104 of exchanging first alkali metal ions in an outer portion of the component with second alkali metal ions. The first alkali metal ions have a first size and the second alkali metal ions have a second size larger than the first size. The first alkali metal ions may be exchanged for the second alkali metal ions by immersing the component in a bath comprising the second alkali metal ions. For example, the exchange of ions may form an ion exchange layer which extends to an exchange depth less than a depth of the glass ceramic portion of the component.

Figure 12A:
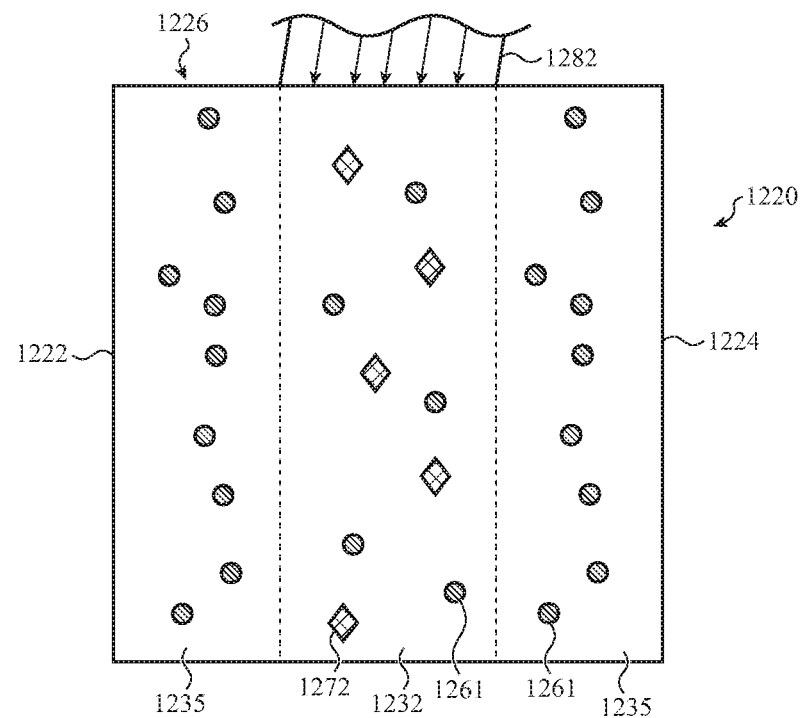
FIGS. 12A and 12B illustrate a beam of radiation crystallizing an internal portion of a glass cover member to form a glass ceramic.
Figure 12B:
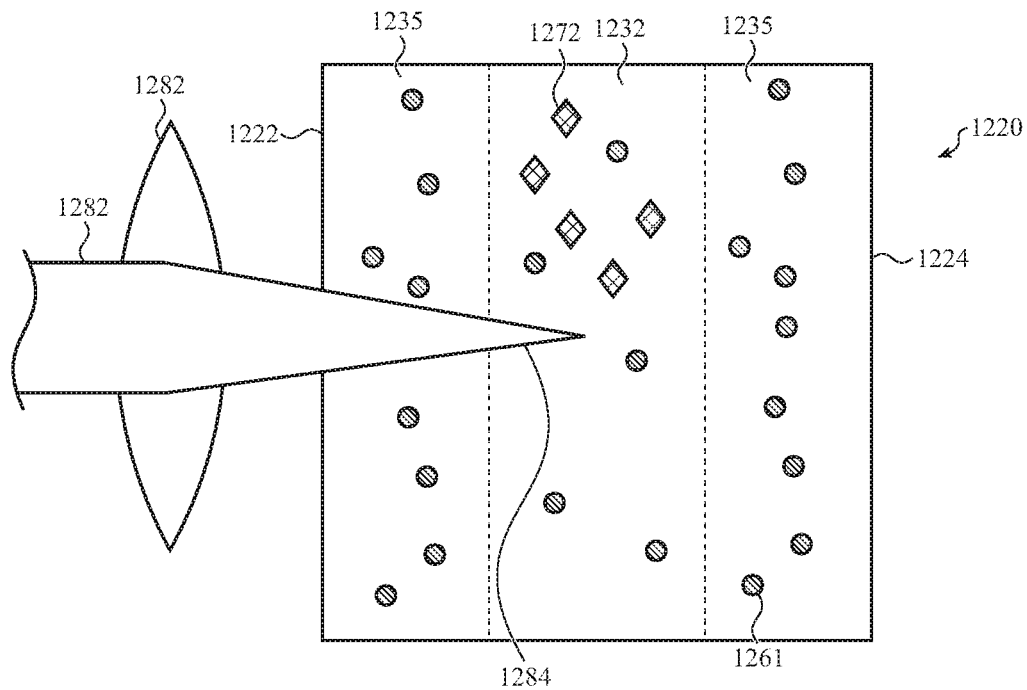
Figure 12C:
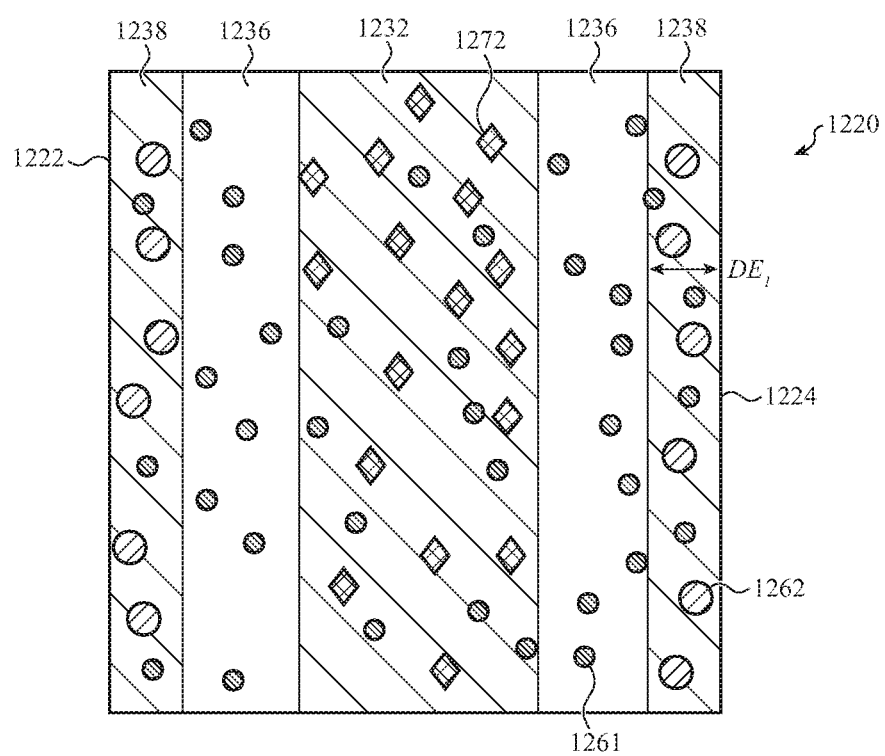
FIG. 12C illustrates a cover member including an internal glass ceramic portion after an ion exchange operation.

FIGS. 12A, 12B, and 12C schematically illustrate three stages in an example process for creating an internal compressive stress region in a component using a combination of selective crystallization of a glass ceramic and ion exchange. FIGS. 12A and 12B illustrate example operations of forming crystals of the glass ceramic using a beam of radiation. Prior to exposing a cover member to the beam of radiation, the cover member comprises a glass including a first alkali metal ion 1261 throughout a thickness of the glass component. The entirety of cover member 1220 is not shown in FIGS. 12A-12C in order to provide a more detailed view.

FIG. 12A illustrates an example of forming crystals of the glass ceramic in an internal portion of the glass component. In FIG. 12A, beam 1282 heats inner portion 1232 of cover member 1220. As a result, crystals 1272 form in inner portion 1232, but not in portions 1235. As shown in FIG. 12A, beam 1282 may be a broad beam configured to deliver energy to a relatively large area. The beam 1282 may be provided by a laser, such as a gas laser, a chemical laser, a solid state laser, a fiber laser, a photonic crystal laser, or a semiconductor laser. The beam 1282 may deliver energy to the component through side surface 1226, which joins front surface 1222 and back surface 1224.

FIG. 12B illustrates another example of forming crystals of the glass ceramic in an internal portion of the glass component using a beam of radiation. As in FIG. 12A, beam 1282 heats inner portion 1232 of cover member 1220. As a result, crystals 1272 form in inner portion 1232, but not in portions 1235. As shown in FIG. 12B, the beam 1282 may be focused to create focused beam 1284 which can deliver energy to a narrower beam spot. One or more lenses may be used to focus beam 1282. The focused beam 1284 may deliver energy to the component through a surface of the component, such as front surface 1222. The focused beam 1284 may be moved over the cover member 1220 to form crystals 1274 in inner portion 1232.

FIG. 12C illustrates the cover member 1220 after the operation of ion exchanging first alkali metal ions in an outer portion of the component with second alkali metal ions. The first alkali metal ions have a first size and the second alkali metal ions have a second size larger than the first size. For example, the exchange of ions may form an ion exchange layer which extends to an exchange depth $DE_1$ less than a depth of the glass ceramic portion of the component.

As a result, inner portion 1232 of the glass cover member 1220 comprises crystals 1272 of the glass ceramic and first alkali metal ions 1261. Outer portion 1238 of the glass cover member 1220 comprises the first alkali metal ions 1261 and the second alkali metal ions 1262. Portion 1236 comprises the first alkali metal ions 1261 and is depleted of the second alkali metal ions 1262 as compared to outer portion 1238. The composition and phase profile of FIG. 12C can produce an internal compressive stress region within inner portion 1232, as previously discussed with respect to FIGS. 10A and 10B.

Figure 13A:
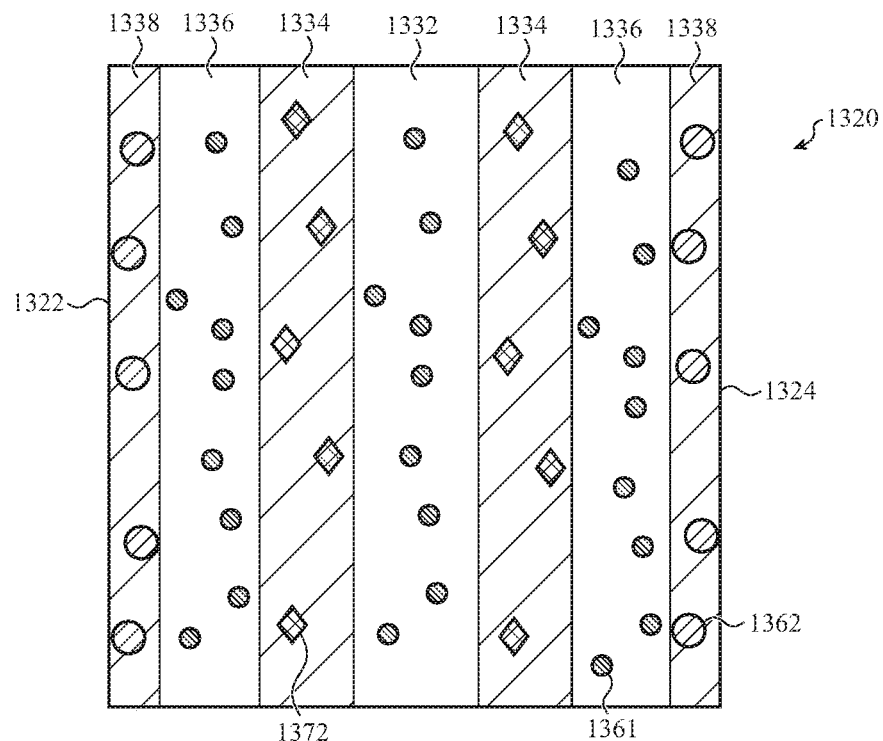
FIG. 13A shows a detailed view of another example cover member having an internal compressive stress region created at least in part by crystallizing a portion of a glass cover member to form a glass ceramic portion.

FIG. 13A shows a detailed view of the inset 2-2 of FIG. 4A for an example cover member 1320 having an internal compressive stress region created at least in part by forming a glass ceramic region within the cover member 1320. The cover member 1320 comprises portion 1334 including crystals 1372 of the glass ceramic. The cover member 1320 of FIG. 13A also comprises an outer portion 1338, portion 1336 inward from outer portion 1338, and inner portion 1332. Outer portion 1338, portion 1336, and inner portion 1332 each may comprise a glass, such as an aluminosilicate or an aluminoborosilicate glass. Portion 1336 may comprise first alkali metal ions having a first size. The outer portion 1338 may further comprise second alkali metal ions having a second size and may be enriched in the second alkali metal ions as compared to portion 1336. The second alkali metal ions may be introduced into the outer portion 1338 through an ion exchange process.

Figure 13B:
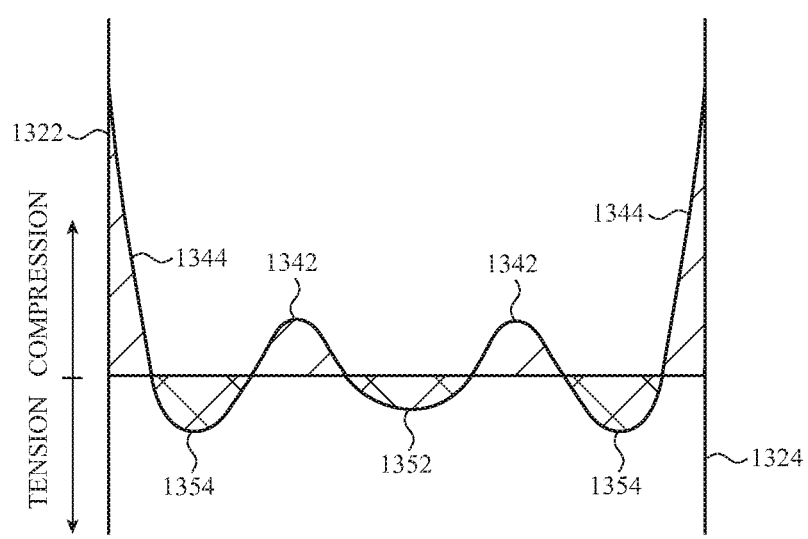
FIG. 13B shows an example of the variation of residual stress across the thickness of the glass cover member of FIG. 13A

FIG. 13B shows an example of the variation of residual stress with position in the sample for the glass cover member of FIG. 13A. Internal compressive stress region 1342 may be located in portion 1334 and created by formation of the glass ceramic. External compressive stress region 1344 may be located in outer portion 1338 and created as a result of an ion exchange operation. As shown in FIG. 13B, a level of the compressive stress is greater in external compressive stress region 1344 than in internal compressive stress region 1342.

The cover member 1320 further comprises an internal tensile stress region 1354 between the internal compressive stress region 1342 and the external compressive stress region 1344. The tensile stress in internal tensile stress region 1354 at least partially balances the residual compressive stress in the cover member 1320. Internal tensile stress region 1354 is at least partially located in portion 1336 of the cover member 1320. In some embodiments, the internal tensile stress region 1354 may extend slightly into inner portion 1332 and/or outer portion 1338 of the glass cover member 1320. The cover member 1320 further comprises internal tensile stress region 1352 inward from internal compressive stress region 1342. The tensile stress in internal tensile stress region 1352 at least partially balances the residual compressive stress in the glass cover member. Internal tensile stress region 1352 is at least partially located in inner portion 1332 of the cover member 1320.

In embodiments, at least one of the internal compressive stress regions may be created in a laminate component comprising layers having different compositions and/or properties. In further embodiments, an internal compressive stress region may be created in an inner layer of a glass component having different thermal expansion and/or ion expansion properties than outer layers of the glass component. As another example, the glass laminate component comprises a first outer layer formed from a first glass material, an inner layer formed from a second glass material, and a second outer layer formed from a third glass material. Alternately, each of these glass materials may be referred to as a glass. The second glass material may be the same as or different from the third glass material. Each of the inner layer, the first outer layer, and the second outer layer may have a thickness.

The glass component may further comprise an external compressive stress region, an internal tensile stress region inward from the external compressive stress region, and an internal compressive stress region inward from the internal tensile stress region. As an example, the first outer layer of the component includes the external compressive stress region. The second outer layer of the component may also include the external compressive stress region. The external compressive stress region may extend from a surface of the glass component to a first depth in the component. The internal compressive stress layer may be located in the inner layer. For example, the internal compressive stress layer may extend from the second depth to the third depth. The internal tensile stress layer may extend from the first depth to the second depth.

The first outer layer of the component may extend from a first surface to the second depth in the component, with an interface between the first outer layer of the component and the inner layer of the component located at the second depth. The second outer layer of the component may extend from a second surface to the third depth in the component, with an interface between the second outer layer of the component and the inner layer of the component located at the third depth.

In further embodiments, the glass component may comprise a first external compressive stress region and a second external compressive stress region and an internal compressive stress region. For example, the first external compressive stress region extends from a first surface to a first depth in the component and the second external compressive stress region extends from a second surface to a fourth depth in the component. The glass component may further comprise a first internal tensile stress region extending from the first depth to a second depth in the component, an internal compressive stress region extending from the second depth to a third depth in the component, and a second internal tensile stress region extending from the fourth depth to the third depth of the component. The first outer layer may include the first external compressive stress region and the first internal tensile stress region. The second outer layer may include the second external compressive stress region and the second internal tensile stress region. The inner layer may include the internal compressive stress region.

In an example, the first outer layer of the component extends from the first surface to the second depth in the component, with an interface between the first outer layer of the component and the inner layer of the component located at the second depth. The second outer layer of the component extends from the second surface to the third depth in the component, with an interface between the second outer layer of the component and the inner layer of the component located at the third depth.

Figure 14A:
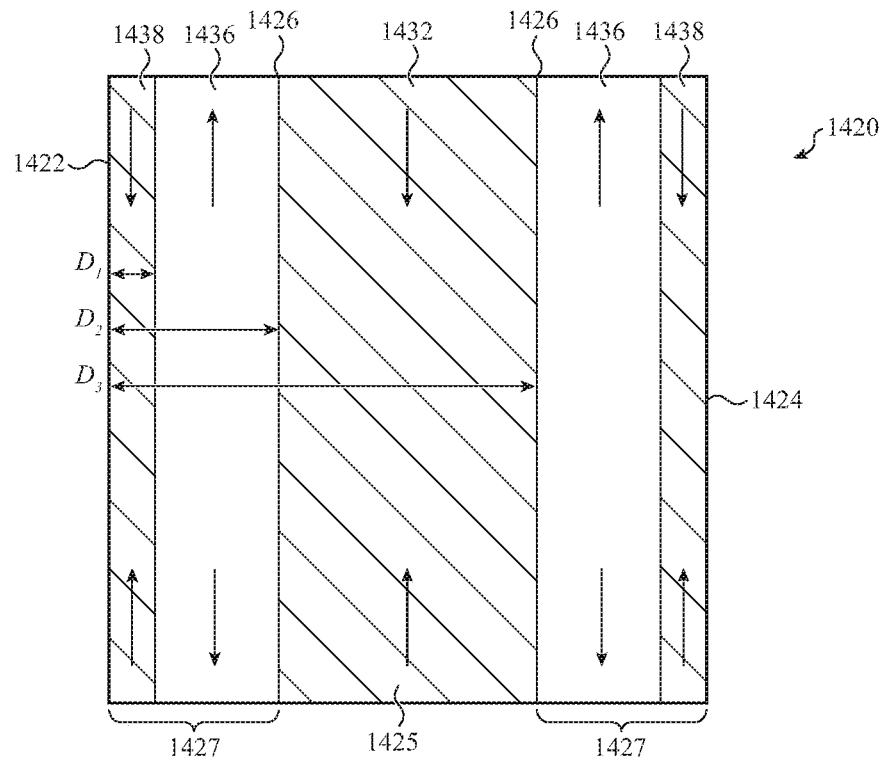
FIG. 14A illustrates an example glass laminate cover member having an internal compressive stress region.

FIG. 14A illustrates formation of an internal compressive stress region in an example glass laminate cover member 1420. As shown in FIG. 14A, the glass laminate cover member 1420 comprises inner layer 1425 and outer layers 1427. The inner layer 1425 may join each of the outer layers 1427 at interface 1426. Inner layer 1425 may be formed from a first glass material and each of the outer layers 1427 may be formed of a second glass material. Each outer layer 1427 may comprise an outer portion 1438 and a portion 1436 inward from the outer portion 1438. Although outer portion 1438 and portion 1436 are both formed from the second glass material, the composition of outer portion 1438 may differ from that of the second glass material due to ion exchange.

Figure 14B:
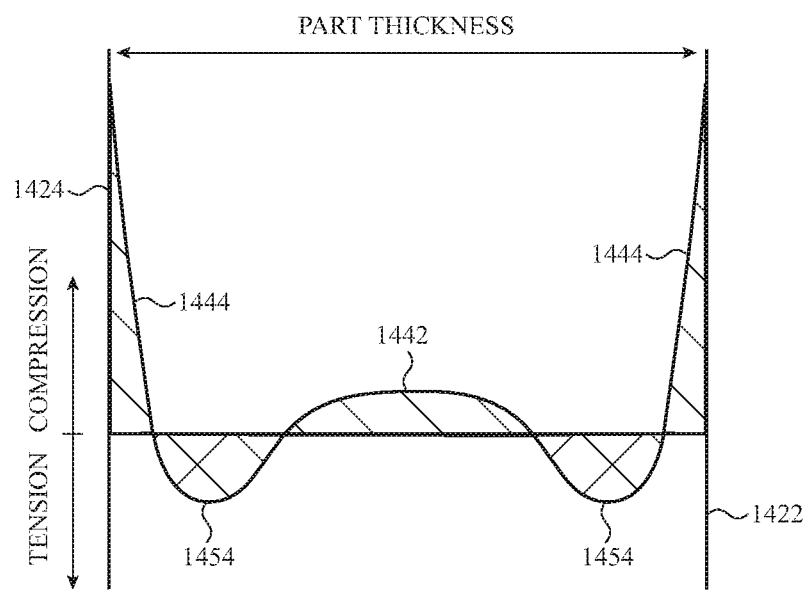
FIG. 14B shows an example of the variation of residual stress across the thickness of the glass laminate cover member of FIG. 14A.

FIG. 14B shows an example of the variation of residual stress with position in the sample for the glass laminate cover member 1420 of FIG. 14A. The glass laminate cover member 1420 has an internal compressive stress region 1442 located in inner layer 1425. The internal compressive stress region 1442 is created as a result of differences in one or more properties between the first glass material and the second glass material. An external compressive stress region 1444 is located in outer portion 1438 along surfaces 1422 and 1424. The external compressive stress region 1444 may be created by an ion exchange. An internal tensile stress region 1454 is located between the internal compressive stress region 1442 and the external compressive stress region 1444. As shown in FIG. 14B, a level of the compressive stress is greater in the external compressive stress region 1444 than in internal compressive stress region 1442.

In embodiments, the laminate may comprise outer layers each having a higher coefficient of thermal expansion than that of an inner layer. As an example, the first glass material has a first coefficient of thermal expansion, the second glass material has a second coefficient of thermal expansion, and the third glass material has a third coefficient of thermal expansion. The first coefficient of thermal expansion may be lower than the second coefficient of thermal expansion and lower than the third coefficient of thermal expansion. The second coefficient of thermal expansion may be the same as or different from the third coefficient of thermal expansion. For example, the outer layers may have a coefficient of thermal expansion greater than that of the inner layer by at least 10%, 25%, or 50%. In embodiments, the first glass material may be a borosilicate glass and the second and third glass materials may be aluminosilicate glasses. The difference between the coefficient of thermal expansion of the outer layers and the inner layer may create a compressive stress region in the inner layer upon cooling of the laminate from a lamination temperature. The difference between the coefficient of thermal expansion of the outer layers and the inner layer may be limited to prevent cracking at the interface between the outer layers and the inner layer.

Figure 15A:
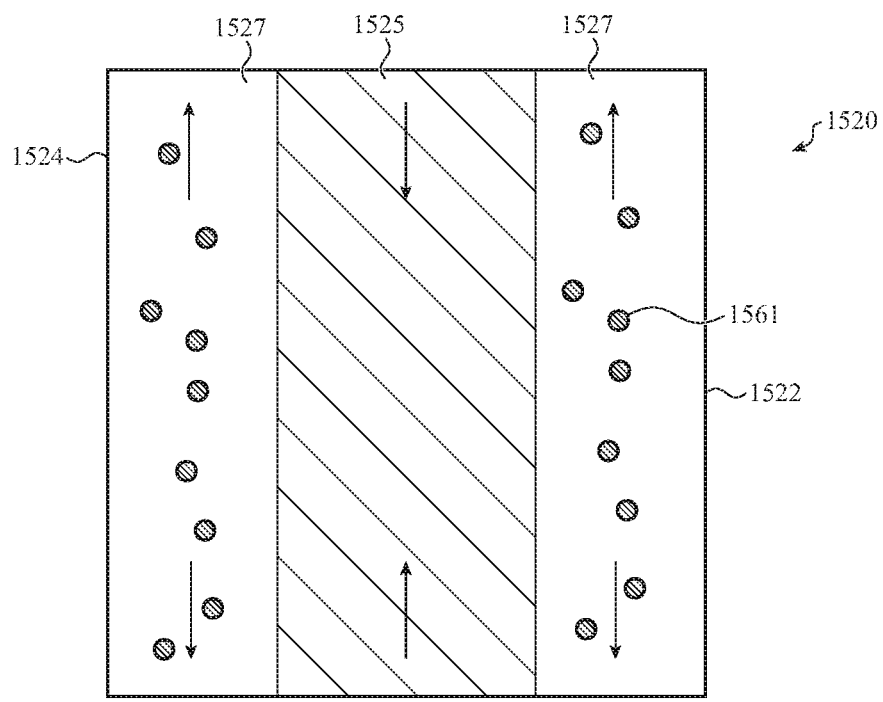
FIGS. 15A and 15B illustrate stages of an example method for forming an internal compressive stress region in a glass laminate cover member.
Figure 15B:
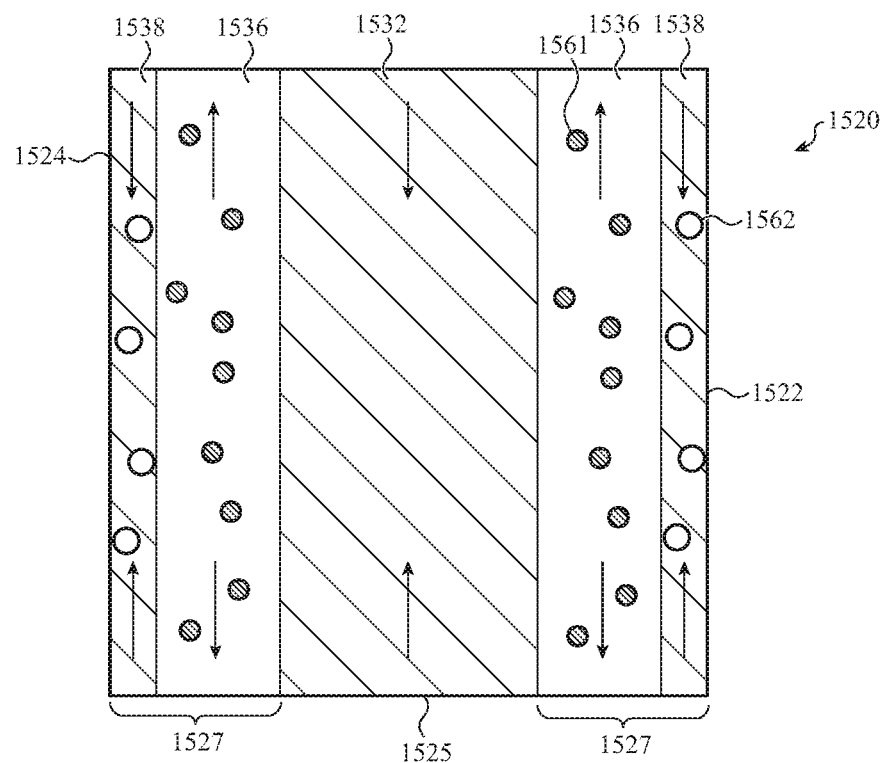

FIGS. 15A and 15B schematically illustrate two stages in an example process for creating an internal compressive stress region in a glass laminate cover member 1520. In this example, the first glass material of inner layer 1525 has a lower coefficient of thermal expansion than the second glass material of the outer layers 1527. FIG. 15A illustrates the glass laminate cover member 1520 after formation of the laminate. As an example, the layers of the laminate may be directly bonded to each other without an interstitial bonding agent. As another example, the glass laminate may include an interstitial bonding agent between layers such as a glass frit. As shown in FIG. 15A, the second glass material comprises a first alkali metal ion 1561 having a first size. After the inner layer 1525 is laminated between the outer layers 1527 at a lamination temperature, the glass laminate cover member 1520 is cooled to a lower temperature, such as room temperature. Cooling of the glass laminate cover member 1520 creates an internal compressive stress region in inner layer 1525 (indicated by the arrows facing each other) and an external tensile stress region in the outer layer 1527 (indicated by the arrows facing away from each other).

FIG. 15B shows the glass laminate cover member 1520 of FIG. 15A after an ion exchange operation. In the ion exchange operation, at least some of the first alkali metal ions 1561 in each of the outer layers 1527 are exchanged with second alkali metal ions 1562 having a second size greater than the first size. The ion exchange occurs to a depth less than a thickness of each of the outer layers 1527. Outer portion 1538 of glass laminate cover member 1520 is enriched in the second alkali metal ions 1562 as compared to portion 1536. As indicated by the arrows, the ion exchange creates external compressive stress regions; each external compressive stress region is located in an outer portion 1538 of each of the outer layers 1527 adjacent a surface 1522, 1524 of the glass component. The ion exchange also creates internal tensile stress regions, each of the internal tensile stress regions at least partially located in one of the outer layers between one of the external compressive stress regions and the internal compressive stress region.

In additional embodiments, the laminate may comprise an inner layer having a greater tendency to expand in response to ion exchange than the outer layers. For example, the inner layer may have a larger network dilation coefficient than the outer layers. As an example, the first glass material may have a first network dilation coefficient, the second glass material may have a second network dilation coefficient, and the third glass material may have a third network dilation coefficient. The first network dilation coefficient may be greater than the second network dilation coefficient and the third network dilation coefficient. The second network dilation coefficient may be the same as or different from the third network dilation coefficient. The network dilation coefficient, also known as the linear network dilation coefficient, may be given by $$B = \frac{1}{3}\frac{1}{V}\frac{\partial V}{\partial C},$$

where V is the molar volume and C is the local concentration of the substituted alkali metal ion. For example, the inner layer may have a linear network dilation coefficient greater than that of the outer layers of at least 10%, 25%, or 50%. The greater tendency for expansion in response to ion exchange can create a compressive stress region in the inner layer after ion exchange of the laminate.

Figure 16A:
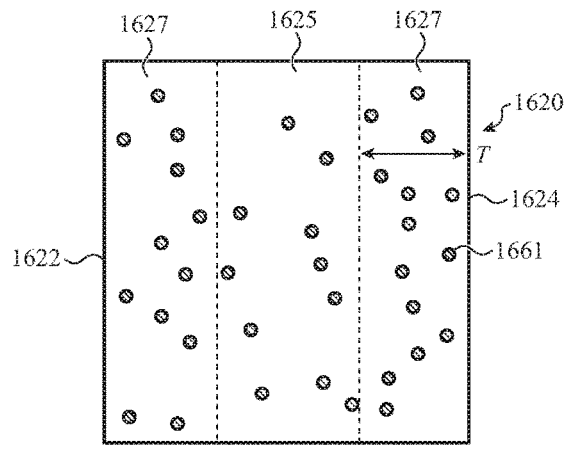
FIGS. 16A, 16B, and 16C illustrate stages of another example method for forming an internal compressive stress region in a glass laminate cover member.
Figure 16B:
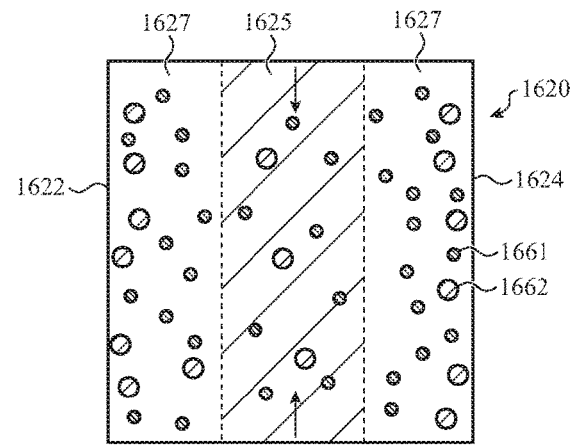
Figure 16C:
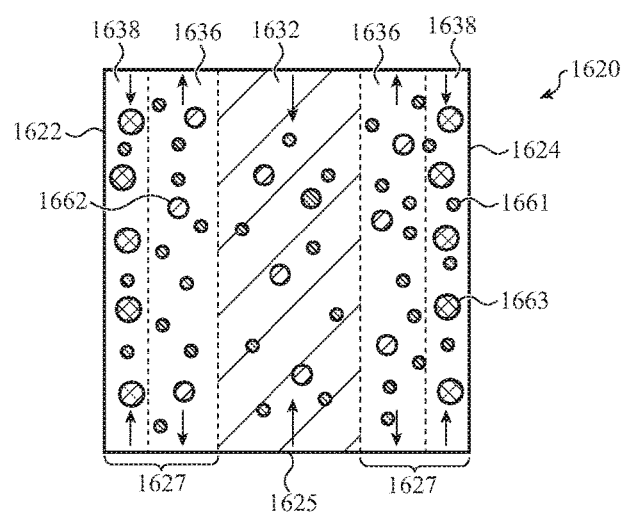

FIGS. 16A, 16B, and 16C schematically illustrate three stages in an example process for creating an internal compressive stress region in a glass laminate cover member 1620. In this example, the inner layer 1625 has a greater tendency to expand in response to ion exchange than the outer layers 1627. FIG. 16A illustrates the glass laminate cover member 1620 after formation of the laminate. As shown in FIG. 16A, both the inner layer and the outer layers comprise first alkali metal ions 1661.

FIG. 16B illustrates the glass laminate cover member 1620 after a first ion exchange operation in which at least some of the first alkali metal ions are exchanged with second alkali metal ions 1662 having a second size greater than the first size to a depth greater than a thickness of the outer glass layer 1627. As indicated by the arrows, the ion exchange creates an internal compressive stress region.

FIG. 16C illustrates the glass laminate cover member 1620 after a second ion exchange operation in which at least some of the second alkali metal ions 1662 are exchanged with third alkali metal ions 1663 having a third size greater than the second size. The second ion exchange occurs to a depth less than a thickness of the outer layer 1627. Outer portion 1638 of glass laminate cover member 1620 is enriched in the third alkali metal ions 1663 as compared to portion 1636. As indicated by the arrows, the ion exchange creates external compressive stress regions; each external compressive stress region is located in an outer portion 1638 of each of the outer glass layers 1627 adjacent a surface 1624, 1622 of the glass component. The ion exchange also creates internal tensile stress regions, each of the internal tensile stress regions at least partially located in one of the outer glass layers between one of the external compressive stress regions and the internal compressive stress region.

Figure 17:
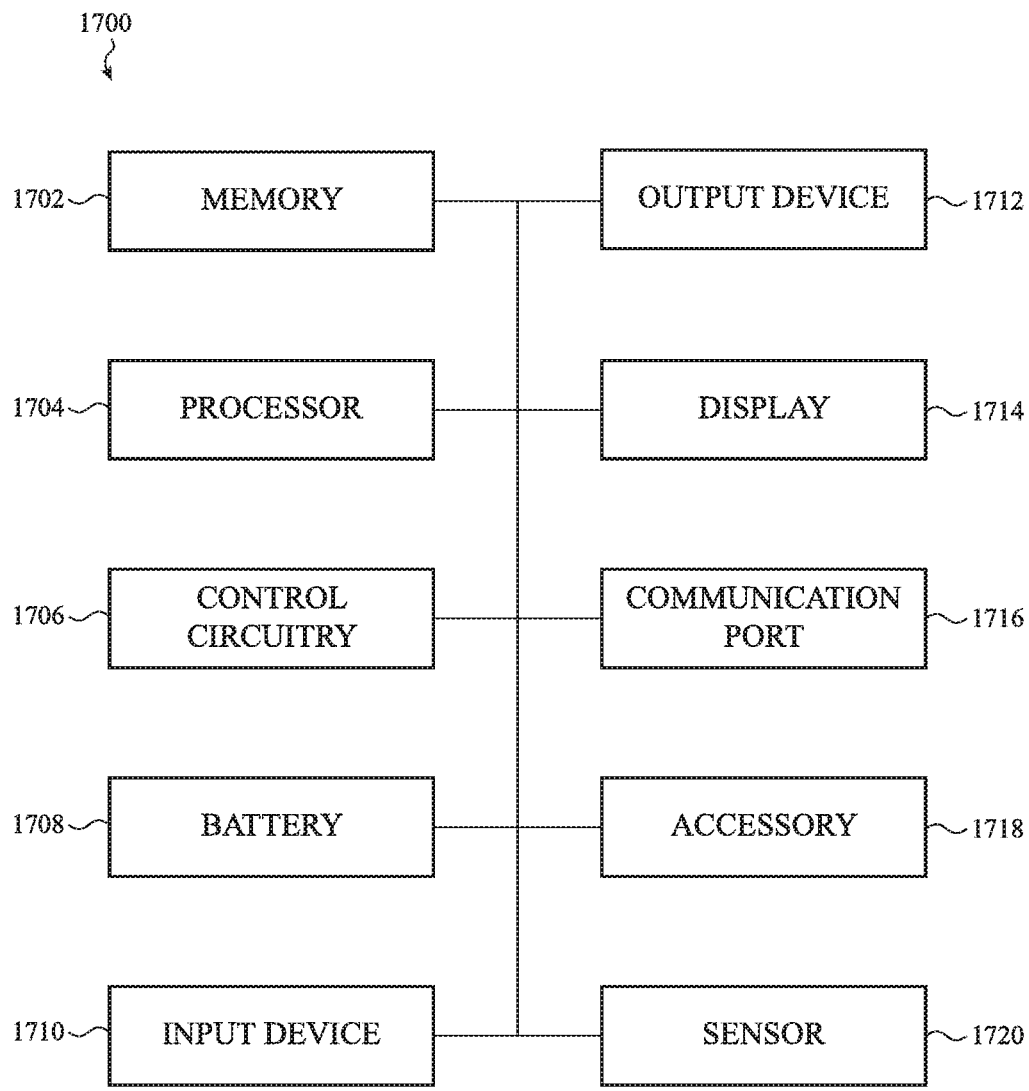
FIG. 17 shows a block diagram of components of an electronic device.

FIG. 17 is a block diagram of example components of an example electronic device. The schematic representation depicted in FIG. 17 may correspond to components of the devices depicted in FIG. 1A-16C as described above. However, FIG. 17 may also more generally represent other types of electronic devices with a strengthened glass component as described herein.

In embodiments, an electronic device 1700 may include sensors 1720 to provide information regarding configuration and/or orientation of the electronic device in order to control the output of the display. For example, a portion of the display 1714 may be turned off, disabled, or put in a low energy state when all or part of the viewable area of the display 1714 is blocked or substantially obscured. As another example, the display 1714 may be adapted to rotate the display of graphical output based on changes in orientation of the device 1700 (e.g., 90 degrees or 180 degrees) in response to the device 1700 being rotated. As another example, the display 1714 may be adapted to rotate the display of graphical output in response to the device 1700 being folded or partially folded, which may result in a change in the aspect ratio or a preferred viewing angle of the viewable area of the display 1714.

The electronic device 1700 also includes a processor 1704 operably connected with a computer-readable memory 1702. The processor 1704 may be operatively connected to the memory 1702 component via an electronic bus or bridge. The processor 1704 may be implemented as one or more computer processors or microcontrollers configured to perform operations in response to computer-readable instructions. The processor 1704 may include a central processing unit (CPU) of the device 1700. Additionally and/or alternatively, the processor 1704 may include other electronic circuitry within the device 1700 including application specific integrated chips (ASIC) and other microcontroller devices. The processor 1704 may be configured to perform functionality described in the examples above. In addition, the processor or other electronic circuitry within the device may be provided on or coupled to a flexible circuit board in order to accommodate folding or bending of the electronic device. A flexible circuit board may be a laminate including a flexible base material and a flexible conductor. Example base materials for flexible circuit boards include, but are not limited to, polymer materials such as vinyl (e.g., polypropylene), polyester (e.g., polyethylene terephthalate (PET), biaxially-oriented PET, and polyethylene napthalate (PEN)), polyimide, polyetherimide, polyaryletherketone (e.g., polyether ether ketone (PEEK)), fluoropolymer and copolymers thereof. A metal foil may be used to provide the conductive element of the flexible circuit board.

The memory 1702 may include a variety of types of non-transitory computer-readable storage media, including, for example, read access memory (RAM), read-only memory (ROM), erasable programmable memory (e.g., EPROM and EEPROM), or flash memory. The memory 1702 is configured to store computer-readable instructions, sensor values, and other persistent software elements.

The electronic device 1700 may include control circuitry 1706. The control circuitry 1706 may be implemented in a single control unit and not necessarily as distinct electrical circuit elements. As used herein, "control unit" will be used synonymously with "control circuitry." The control circuitry 1706 may receive signals from the processor 1704 or from other elements of the electronic device 1700.

As shown in FIG. 17, the electronic device 1700 includes a battery 1708 that is configured to provide electrical power to the components of the electronic device 1700. The battery 1708 may include one or more power storage cells that are linked together to provide an internal supply of electrical power. The battery 1708 may be operatively coupled to power management circuitry that is configured to provide appropriate voltage and power levels for individual components or groups of components within the electronic device 1700. The battery 1708, via power management circuitry, may be configured to receive power from an external source, such as an alternating current power outlet. The battery 1708 may store received power so that the electronic device 1700 may operate without connection to an external power source for an extended period of time, which may range from several hours to several days. The battery 1708 may be flexible to accommodate bending or flexing of the electronic device. For example, the battery 1708 may be mounted to a flexible housing or may be mounted to a flexible printed circuit. In some cases, the battery 1708 is formed from flexible anodes and flexible cathode layers and the battery cell is itself flexible. In some cases, individual battery cells are not flexible, but are attached to a flexible substrate or carrier that allows an array of battery cells to bend or fold around a foldable region of the device.

In some embodiments, the electronic device 1700 includes one or more input devices 1710. The input device 1710 is a device that is configured to receive input from a user or the environment. The input device 1710 may include, for example, a push button, a touch-activated button, capacitive touch sensor, a touch screen (e.g., a touch-sensitive display or a force-sensitive display), capacitive touch button, dial, crown, or the like. In some embodiments, the input device 1710 may provide a dedicated or primary function, including, for example, a power button, volume buttons, home buttons, scroll wheels, and camera buttons.

The device 1700 may also include one or more sensors 1720, such as a force sensor, a capacitive sensor, an accelerometer, a barometer, a gyroscope, a proximity sensor, a light sensor, or the like. The sensors 1720 may be operably coupled to processing circuitry. In some embodiments, the sensors 1720 may detect deformation and/or changes in configuration of the electronic device and be operably coupled to processing circuitry which controls the display based on the sensor signals. In some implementations, output from the sensors 1720 is used to reconfigure the display output to correspond to an orientation or folded/unfolded configuration or state of the device. Example sensors 1720 for this purpose include accelerometers, gyroscopes, magnetometers, and other similar types of position/orientation sensing devices. In addition, the sensors 1720 may include a microphone, acoustic sensor, light sensor, optical facial recognition sensor, or other types of sensing device.

In some embodiments, the electronic device 1700 includes one or more output devices 1712 configured to provide output to a user. The output device 1712 may include display 1714 that renders visual information generated by the processor 1704. The output device 1712 may also include one or more speakers to provide audio output. The output device 1712 may also include one or more haptic devices that are configured to produce a haptic or tactile output along an exterior surface of the device 1700.

The display 1714 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 1714 is a liquid-crystal display or an electrophoretic ink display, the display 1714 may also include a backlight component that can be controlled to provide variable levels of display brightness. If the display 1714 is an organic light-emitting diode or organic electroluminescent type display, the brightness of the display 1714 may be controlled by modifying the electrical signals that are provided to display elements. In addition, information regarding configuration and/or orientation of the electronic device may be used to control the output of the display as described with respect to input devices 1710. In some cases, the display is integrated with a touch and/or force sensor in order to detect touches and/or forces applied along an exterior surface of the device 1700.

The electronic device 1700 may also include a communication port 1716 that is configured to transmit and/or receive signals or electrical communication from an external or separate device. The communication port 1716 may be configured to couple to an external device via a cable, adaptor, or other type of electrical connector. In some embodiments, the communication port 1716 may be used to couple the electronic device to a host computer.

The electronic device 1700 may also include at least one accessory 1718, such as a camera, a flash for the camera, or other such device. The camera may be connected to other parts of the electronic device 1700 such as the control circuitry 1706.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A strengthened glass component for an electronic device, comprising:
   first alkali metal ions having a first size, second alkali metal ions having a second size greater than the first size, and third alkali metal ions having a third size greater than the second size;
   a first external surface defining at least a portion of an exterior of the electronic device;
   a first external compressive stress region along the first external surface;
   a first internal tensile stress region inward from the first external compressive stress region;
   a first internal compressive stress region inward from the first internal tensile stress region;
   a second external surface opposite to the first external surface;
   a second external compressive stress region along the second external surface;
   a second internal tensile stress region inward from the second external compressive stress region;
   a second internal compressive stress region inward from the second internal tensile stress region; and
   a third internal tensile stress region between the first internal compressive stress region and the second internal compressive stress region, wherein:
   the first, the second, and the third internal tensile stress regions each includes at least a respective portion of the first alkali metal ions;
   the first internal compressive stress region and the second internal compressive stress region are enriched in the second alkali metal ions as compared to the first, the second, and the third internal tensile stress regions; and
   the first external compressive stress region and the second external compressive stress region are enriched in the third alkali metal ions as compared to the first and the second internal tensile stress regions.

2. The strengthened glass component of claim 1, wherein the strengthened glass component is formed from a single piece of glass.

3. The strengthened glass component of claim 2, wherein:
   the strengthened glass component comprises an aluminosilicate or an aluminoborosilicate glass.

4. The strengthened glass component of claim 1, wherein the first alkali metal ions are lithium ions, the second alkali metal ions are sodium ions, and the third alkali metal ions are potassium ions.

5. The strengthened glass component of claim 1, wherein the strengthened glass component is ion-exchanged in each of the first and the second external compressive stress regions, the first and the second internal tensile stress regions, and the first and the second internal compressive stress regions.

6. The strengthened glass component of claim 1, wherein a thickness of the strengthened glass component is from 0.1 mm to 2 mm.

7. A strengthened component comprising:
   a first glass layer defining a first surface of the strengthened component and including:
   an ion-exchanged first portion along the first surface;

a first external compressive stress region located within the ion-exchanged first portion;
a second portion inward of the ion-exchanged first portion and having a first coefficient of thermal expansion; and
a first internal tensile stress region located at least partially within the second portion;
a second glass layer defining a second surface of the strengthened component and including:
an ion-exchanged third portion along the second surface;
a second external compressive stress region located within the ion-exchanged third portion;
a fourth portion inward of the ion-exchanged third portion and having a second coefficient of thermal expansion; and
a second internal tensile stress region located at least partially within the fourth portion; and
an inner layer comprising:
a glass ceramic having a third coefficient of thermal expansion less than the first and the second coefficients of thermal expansion; and
an internal compressive stress region located within the inner layer.

8. The strengthened component of claim 7, wherein:
each of the first glass layer and the second glass layer comprises an aluminosilicate glass; and
the inner layer comprises an aluminosilicate glass ceramic.

9. The strengthened component of claim 8, wherein:
each of the second portion and the fourth portion comprises first alkali metal ions having a first size;
each of the ion-exchanged first portion and the ion-exchanged third portion comprises second alkali metal ions having a second size greater than the first size; and
the first alkali metal ions are lithium ions and the second alkali metal ions are potassium ions.

10. The strengthened component of claim 7, wherein the strengthened component is formed from a single piece of glass.

11. The strengthened component of claim 7, wherein the inner layer comprises a volume percentage of crystals from 30% to less than 100%.

12. The strengthened component of claim 11, wherein the strengthened component is transparent to visible light.

13. The strengthened component of claim 11, wherein the strengthened component is translucent.

14. A method of strengthening a glass component for an electronic device, the method comprising:
a first operation comprising exchanging a portion of first alkali metal ions in the glass component with second alkali metal ions having a second size larger than a first size of the first alkali metal ions, thereby forming a first ion-exchanged layer along a first surface and a second surface of the glass component;
a second operation comprising exchanging a portion of the second alkali metal ions in the first ion-exchanged layer with the first alkali metal ions, thereby forming a second ion-exchanged layer along the first and the second surfaces, the second ion-exchanged layer having a depth less than a depth of the first ion-exchanged layer; and
a third operation comprising exchanging a portion of the first alkali metal ions in the second ion-exchanged layer with third alkali metal ions, the third alkali metal ions having a third size greater than the second size, thereby forming a third ion-exchanged layer along the first and the second surfaces, the third ion-exchanged layer having a depth less than the depth of the second ion-exchanged layer, a resulting strengthened glass component comprising:
a first external compressive stress region along the first surface and a second external compressive stress region along the second surface;
a first internal compressive stress region and a second internal compressive stress region;
a first internal tensile stress region between the first external compressive stress region and the first internal compressive stress region;
a second internal tensile stress region between the first internal compressive stress region and the second internal compressive stress region; and
a third internal tensile stress region between the second external compressive stress region and the second internal compressive stress region.

15. The method of claim 14, wherein:
each of the first internal compressive stress region and the second internal compressive stress region is configured to deflect a crack propagating through the first internal tensile stress region or the second internal tensile stress region.

16. The method of claim 14, wherein:
the glass component comprises an aluminosilicate or an aluminoborosilicate glass including the first alkali metal ions;
the first internal compressive stress region and the second internal compressive stress region are enriched in the second alkali metal ions as compared to the first, the second, and the third internal tensile stress regions;
the first external compressive stress region and the second external compressive stress region are enriched in the third alkali metal ions as compared to the first and the second internal tensile stress regions; and
each of the first internal tensile stress region and the second internal tensile stress region includes a respective portion of the first alkali metal ions exchanged for the portion of the second alkali metal ions during the second operation.

17. The method of claim 14, wherein the second operation and the third operation occur concurrently.

18. The method of claim 14, wherein:
the third internal tensile stress region includes a midpoint of a thickness of the glass component.

19. The method of claim 14, wherein a maximum level of compressive stress in the first and the second external compressive stress regions is from 3 to 10 times a maximum level of compressive stress in the first and the second internal compressive stress regions.

20. The method of claim 14, wherein the first alkali metal ions are lithium ions, the second alkali metal ions are sodium ions, and the third alkali metal ions are potassium ions.

* * * * *